United States Patent
Hu et al.

(10) Patent No.: US 10,002,043 B2
(45) Date of Patent: *Jun. 19, 2018

(54) MEMORY DEVICES AND MODULES

(71) Applicant: Samsung Electronics Co., Ltd., Suwon-si, Gyeonggi-do (KR)

(72) Inventors: Chaohong Hu, San Jose, CA (US); Liang Yin, San Jose, CA (US); Hongzhong Zheng, Sunnyvale, CA (US); Uksong Kang, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1 day.

This patent is subject to a terminal disclaimer.

(21) Appl. No.: 14/678,968

(22) Filed: Apr. 4, 2015

(65) Prior Publication Data

US 2016/0055059 A1 Feb. 25, 2016

Related U.S. Application Data

(63) Continuation-in-part of application No. 14/594,049, filed on Jan. 9, 2015, now abandoned.

(Continued)

(51) Int. Cl.
*G06F 11/00* (2006.01)
*G06F 11/10* (2006.01)
(52) U.S. Cl.
CPC .......... *G06F 11/10* (2013.01); *G06F 11/1008* (2013.01); *G06F 11/1076* (2013.01)
(58) Field of Classification Search
CPC ................................................... G06F 11/008

(Continued)

(56) References Cited

U.S. PATENT DOCUMENTS 6,370,668 B1 4/2002 Garrett, Jr. et al.
7,366,947 B2 4/2008 Gower et al.
(Continued)

OTHER PUBLICATIONS

Bianca Schroeder et al., "DRAM Errors in the Wild: A Large-Scale Field Study," ACM SIGMETRICS Performance Evaluation Review, vol. 37, No. 1, pp. 193-204, ACM 2009, (URL: http://www.cs.utoronto.ca/~bianca/papers/sigmetrics09.pdf).

(Continued)

*Primary Examiner* — Dieu-Minh Le
(74) *Attorney, Agent, or Firm* — Renaissance IP Law Group LLP

(57) ABSTRACT

A memory device includes a memory, a data interface, an error interface and a controller. The data interface communicates data to and from the memory device through an external main memory path. The error interface communicates error information from the memory device through an external system control path and that is separate from the main memory path. The controller is coupled to the data interface, the error interface, and the memory. The controller includes an ECC engine and an ECC controller. The ECC engine corrects an error in data that is read from the memory and generates corrected data by encoding data written to the memory and decoding data read from the memory, generates error information, transmits the corrected data through the data interface, and transmits the error information through the error interface. The ECC controller records the error information in response to the ECC engine.

16 Claims, 21 Drawing Sheets

Related U.S. Application Data

(60) Provisional application No. 62/057,199, filed on Sep. 29, 2014, provisional application No. 62/039,396, filed on Aug. 19, 2014, provisional application No. 62/075,231, filed on Nov. 4, 2014.

(58) Field of Classification Search
USPC .............. 714/6.1, 6.2, 6.21, 6.22, 6.24, 6.32
See application file for complete search history.

(56) References Cited

U.S. PATENT DOCUMENTS

| | | | |
|---|---|---|---|
| 7,487,428 B2 | 2/2009 | Co et al. | |
| 7,587,658 B1* | 9/2009 | Tong | G06F 11/1012 |
| | | | 714/763 |
| 7,934,052 B2 | 4/2011 | Prins et al. | |
| 7,949,931 B2* | 5/2011 | Lastras-Montano | G06F 11/1044 |
| | | | 714/768 |
| 7,978,516 B2 | 7/2011 | Olbrich et al. | |
| 8,245,101 B2 | 8/2012 | Olbrich et al. | |
| 8,301,980 B2 | 10/2012 | Gruner et al. | |
| 8,412,978 B2 | 4/2013 | Flynn et al. | |
| 8,443,263 B2 | 5/2013 | Selinger et al. | |
| 8,452,929 B2 | 5/2013 | Bennett | |
| 8,707,110 B1* | 4/2014 | Shaeffer | G06F 11/1004 |
| | | | 714/52 |
| 9,047,211 B2 | 6/2015 | Wood et al. | |
| 9,286,198 B2 | 3/2016 | Bennett | |
| 9,436,548 B2* | 9/2016 | Goodman | G06F 11/1076 |
| 9,645,829 B2 | 5/2017 | Jayakumar et al. | |
| 9,697,147 B2 | 7/2017 | Loh et al. | |
| 9,767,920 B2* | 9/2017 | Kim | G11C 29/42 |
| 2004/0268046 A1 | 12/2004 | Spencer | |
| 2006/0158917 A1* | 7/2006 | Bartley | G11C 7/1012 |
| | | | 365/63 |
| 2008/0016429 A1 | 1/2008 | Saneshige et al. | |
| 2008/0046802 A1* | 2/2008 | Honda | G06F 11/1044 |
| | | | 714/805 |
| 2009/0204871 A1* | 8/2009 | Eggleston | G06F 11/1008 |
| | | | 714/763 |
| 2010/0058144 A1* | 3/2010 | Rohleder | G06F 11/1024 |
| | | | 714/763 |
| 2011/0271164 A1* | 11/2011 | Ahn | G06F 11/1048 |
| | | | 714/752 |
| 2012/0005559 A1 | 1/2012 | Jeong et al. | |
| 2012/0185752 A1* | 7/2012 | Maheshwari | G06F 11/1016 |
| | | | 714/768 |
| 2013/0198587 A1 | 8/2013 | Kim et al. | |
| 2013/0275682 A1 | 10/2013 | Ramanujan et al. | |
| 2014/0164874 A1 | 6/2014 | Franceschini et al. | |
| 2014/0181614 A1 | 6/2014 | Kwok | |
| 2015/0378841 A1 | 12/2015 | Jayakumar et al. | |

OTHER PUBLICATIONS

Intel, "Intel 975X Express Chipset," Datasheet for the Intel 82975X Memory Controller Hub (MCH), Document No. 310158-001, Nov. 2005, pp. 1-274.

Stuart Schechter et al., "Use ECP, not ECC, for Hard Failures in Resistive Memories," ACM SIGARCH Computer Architecture News, vol. 38, No. 3, pp. 141-152, ACM 2010, IEEE International Workshop on Silicon Debug and Diagnosis 2010 (URL: ftp://net6.cs.utexas.edu/pub/dburger/papers/ISCA10.pdf).

Notice of Allowance for U.S. Appl. No. 14/678,977, dated Feb. 9, 2018.

* cited by examiner

MEMORY DEVICES AND MODULES

CROSS-REFERENCE TO RELATED APPLICATIONS

This application claims the benefit of U.S. Provisional Patent Application Nos. 62/039,396, filed Aug. 19, 2014, 62/057,199, filed Sep. 29, 2014, 62/075,231, filed Nov. 4, 2014, and is a continuation-in-part of U.S. patent application Ser. No. 14/594,049, filed Jan. 9, 2015, the contents of each are hereby incorporated by reference herein, in their entirety, for all purposes.

BACKGROUND

This disclosure relates to memory system architectures and, in particular, memory system architectures with error correction.

Memory controllers may be configured to perform error correction. For example, a memory controller may read 72 bits of data from a memory module where 64 bits are data and 8 bits are parity. The memory controller may perform other error correction techniques. Using such techniques, some errors in data read from the memory module may be identified and/or corrected. In addition, the memory controller may make information related to the errors available. A system including the memory controller may make operational decisions based on the error information, such as retiring a memory page, halting the system, or the like. Such a memory controller may be integrated with a processor. For example, Intel Xeon processors may include an integrated memory controller configured to perform error correction.

However, if error correction is performed before data is received by the memory controller, the error information related to the correction may not be available in the memory controller and hence, not available to the system for system management decisions.

SUMMARY

An embodiment includes a memory device, comprising: a memory configured to store data; a data interface; an error interface; and a controller coupled to the data interface, the error interface, and the memory. The controller is configured to transmit data stored in the memory through the data interface; and the controller is configured to transmit error information generated in response to correcting an error in data read from memory through the error interface.

Another embodiment includes a method, comprising: reading, at a memory device, data including an error in response to a read command received through a data interface; recording error information based on reading the data including the error; and transmitting, from the memory module, the error information through an error interface.

Another embodiment includes a memory module, comprising: a data interface; an error interface; a plurality of memory devices, each memory device coupled to the data interface and the error interface and comprising: a memory configured to store data; a controller coupled to the data interface, the error interface, and the memory. The controller is configured to transmit data stored in the memory through the data interface; and the controller is configured to transmit error information generated in response to correcting an error in data read from memory through the error interface.

DETAILED DESCRIPTION

Figure 1:
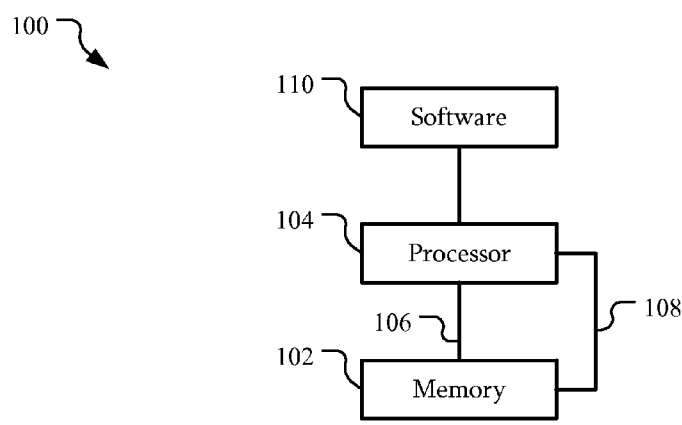
FIG. 1 is a schematic view of a system with a memory system architecture according to an embodiment.

The embodiments relate to memory system architectures. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods and systems provided in particular implementations.

However, the methods and systems will operate effectively in other implementations. Phrases such as "an embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain steps. However, the method and system operate according to other methods having different and/or additional steps and steps in different orders that are not inconsistent with the embodiments. Thus, embodiments are not intended to be limited to the particular embodiments shown, but are to be accorded the widest scope consistent with the principles and features described herein.

The embodiments are described in the context of particular memory system architecture having certain components. One of ordinary skill in the art will readily recognize that embodiments are consistent with the use of memory system architectures having other and/or additional components and/or other features. However, one of ordinary skill in the art will readily recognize that the method and system are consistent with other structures. Methods and systems may also be described in the context of single elements. However, one of ordinary skill in the art will readily recognize that the methods and systems are consistent with the use of memory system architectures having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of a system with a memory system architecture according to an embodiment. The system 100 includes a memory 102 coupled to a processor 104. The memory 102 is configured to store data. When data is read from the memory 102, the memory 102 is configured to correct an error, if any, in the data. For example, the memory 102 may be configured to correct a single-bit error. The memory 102 may also be configured to detect a double-bit error. Although the particular number of errors corrected has been used as an example, the memory 120 may be configured to correct any number of errors or detect any number of errors. Moreover, although one or more error correction techniques may result in single-bit error correction and/or double-bit error detection, the memory 102 may be configured to perform any error correction technique that can correct at least one error.

The memory 102 may include any device that is configured to store data. In a particular example, the memory 102 may be a dynamic random access memory (DRAM) module. The memory 102 may include a double data rate synchronous dynamic random access memory (DDR SDRAM) according to various standards such as DDR, DDR2, DDR3, DDR4, or the like. In other embodiments, the memory 102 may include static random access memory (SRAM), non-volatile memory, or the like.

The memory 102 is configured to generate error information in response to correcting an error and/or attempting to correct an error in the data read from stored data. For example, the error information may include information about a corrected error, an uncorrected error, an absence of an error, a number of such errors, or the like. Error information may include the actual error, an address of the error, number of times the error has occurred, or other information specific to the memory 102. In a particular example, the error information may include information about a single-bit error indicating that the memory 102 corrected the single-bit error. Although particular examples of error information have been described, the error information may include any information related to errors.

The processor 104 may be any device configured to be operatively coupled to the memory 102 and capable of executing instructions. For example, the processor 104 may be a general purpose processor, a digital signal processor (DSP), a graphics processing unit (GPU), an application specific integrated circuit, a programmable logic device, or the like.

The processor 104 is coupled to the memory 102 through a first communication path 106 and a second communication path 108. The processor 104 is configured to receive data from the memory through the first communication path 106. For example, the first communication path 106 may be a system memory interface with signal lines for data signals, strobe signals, clock signals, enable signals, or the like. That is, the communication path 106 may be part of a main memory channel that is the interface between the processor 104 and the memory 102 as the main system memory.

The processor 104 is also coupled to the memory 102 through a different communication path, the second communication path 108. The processor 104 is configured to receive the error information from the memory 102 through the second communication path 108. Thus, in an embodiment, the processor 104 is configured to receive error information and, in particular, corrected error information through a communication path other than the first communication path 106. The corrected error information is error information related to a corrected error. As described above, error information may include various types of information related to an error. Thus, the corrected error information may include similar types of information related to a corrected error.

Software 110 is illustrated as coupled to the processor 104; however, the software 110 represents various programs, drivers, modules, routines, or the like the may be executed on the processor 104. For example, the software 110 may include drivers, kernel modules, daemons, applications, or the like. In some embodiments, the software 110 may enable the processor 104 to be configured to perform particular functions described herein.

Although a single memory 102 has been used as an example, any number of memories 102 may be coupled to the processor 104 through two communication paths similar to the communication paths 106 and 108. In an embodiment, each memory 102 may be coupled to the processor 104 through a dedicated first communication path 106 separate from other memories 102 and a dedicated second communication path 108 also separate from other memories 102. However, in other embodiments, the first communication path 106 may be shared by more than one memory 102 and the second communication path 108 may be shared by more than one memory 102. Furthermore, although a single first communication path 106 has been described, multiple first communication paths 106 between one or more memories 102 may be present. Similarly, although a single second communication path 108 has been described, multiple second communication paths 108 between one or more memories 102 may be present.

In an embodiment, the communication of the error information may be communicated through an out-of-band communication path. The second communication path 108 may be such an out-of-band communication path. That is, the main communication between the processor 104 and the memory 102 may be through the first communication path 106, while the error information is communicated through the out-of-band second communication path 108.

Figure 2:
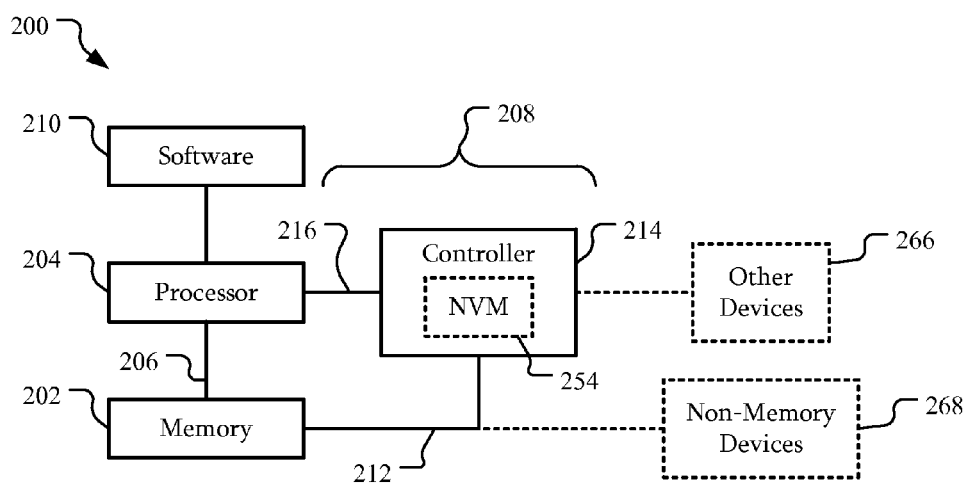
FIG. 2 is a schematic view of a system with a memory system architecture including a controller according to an embodiment.

FIG. 2 is a schematic view of a system with a memory system architecture including a controller according to an embodiment. In this embodiment, the system 200 includes a memory 202, a processor 204, communication paths 206 and 208, and software 210 similar to the memory 102, processor 104, communication paths 106 and 108, and software 110 of FIG. 1. However, the second communication path 208 includes a first bus 212 coupled between a controller 214 and a second bus 216 coupled between the controller 214 and the processor 204. In other words, the controller 214, coupled to both the processor 204 and the memory 202, is part of the second communication path 208.

The controller 214 may be any device configured to be operatively coupled to the memory 202 and the processor 204. For example, the controller 214 may include a general purpose processor, a digital signal processor (DSP), an application specific integrated circuit, a programmable logic device, or the like.

The busses 212 and 216 may be any variety of communication links. For example, the buses 212 and 216 may be a system management bus (SMBus), an inter-integrated circuit (PC) bus, an intelligent platform management interface (IPMI) compliant bus, a Modbus bus, or the like. In a particular embodiment, at least one portion of the communication path 208 may be substantially slower than the communication path 206. For example, the communication path 206 between the memory 202 and processor 204 may be designed for higher data-rate transfers on the order of 10 GB/s; however, the communication path 208 may have a lower data transfer rate on the order of 10 Mbit/s, 100 kbit/s, or the like. Thus, in some embodiments, a ratio of the data transfer speed of the communication path 206 to the communication path 208 may be about 100, 1000, or more.

In an embodiment, the second communication path 208 may be a dedicated communication path. That is, the second communication path 208 may only be used for communication of information between the memory 202 and the processor 204. However, in other embodiments, the controller 214 may allow other devices to be accessible. For example, a non-memory device 268 may be coupled by the bus 212 to the controller 214. In another example, other devices 266 may be coupled to the controller 214. Accordingly, information other than information from the memory 202 may be transmitted over the bus 212 and/or the bus 216 to and from the processor 204 and/or memory 202. In particular, the error information from the memory 202 may be communicated to the processor 204 over a second communication path 208 that is used for other purposes, including non-memory purposes.

In an embodiment, the controller 214 may include non-volatile memory 254. The non-volatile memory 254 may be configured to store error information from the memory 202. Accordingly, error information may be maintained in the controller 214 when power is off. The processor 204 may be configured to request the error information from the controller 214. Accordingly, the controller 214 may be configured to respond to such a request by providing the error information stored in the non-volatile memory 254, accessing the memory 202 to retrieve the error information to respond to the processor 204, or the like.

In an embodiment, the controller 214 may be configured to poll the memory 202 for error information. In another embodiment, the memory 202 may be configured to push error information to the controller 214. Regardless, error information stored in the non-volatile memory 254 may be a substantially up-to-date copy.

Figure 3:
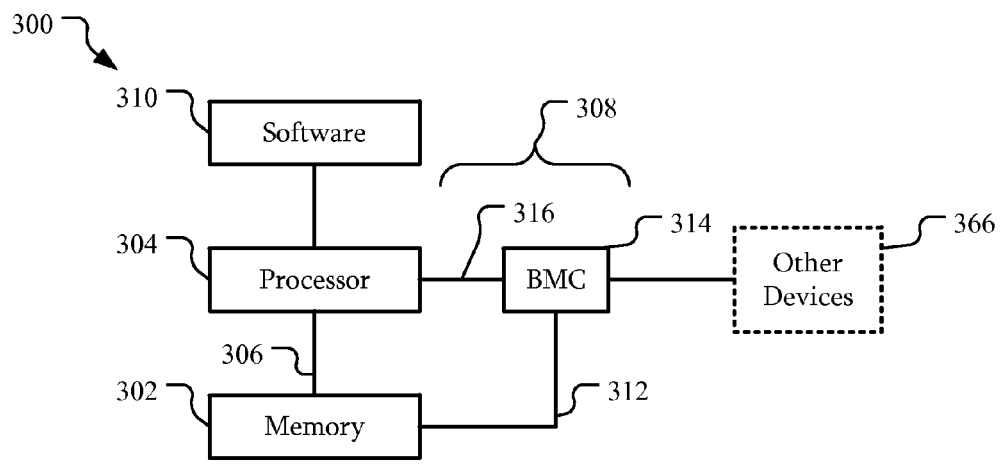
FIG. 3 is a schematic view of a system with a memory system architecture including a baseboard management controller according to an embodiment.

FIG. 3 is a schematic view of a system with a memory system architecture including a baseboard management controller according to an embodiment. In this embodiment, the system 300 includes a memory 302, a processor 304, communication paths 306 and 308, and software 310 similar to the memory 202, processor 204, communication paths 206 and 208, and software 210 of FIG. 2. However, the controller 314 is a baseboard management controller (BMC) 314.

The BMC 314 may be configured to manage the system 300. For example, the BMC 314 may be coupled to various sensors of the system 300, including sensors of the processor 304, memory 302, other devices 366, or the like. The BMC 314 may be configured to collect and report on various system parameters, such as temperature, cooling status, power status, or the like. The BMC 314 may be configured to manage the system and enable access to information according to a standard. The management information may be made available to the processor 304 and hence, available to the software 310. Alternatively, the BMC 314 may make the information available through another communication path, such as an out-of-band communication path. Here, an out-of-band communication path may include any communication path that does not include the processor 304.

Figure 4:
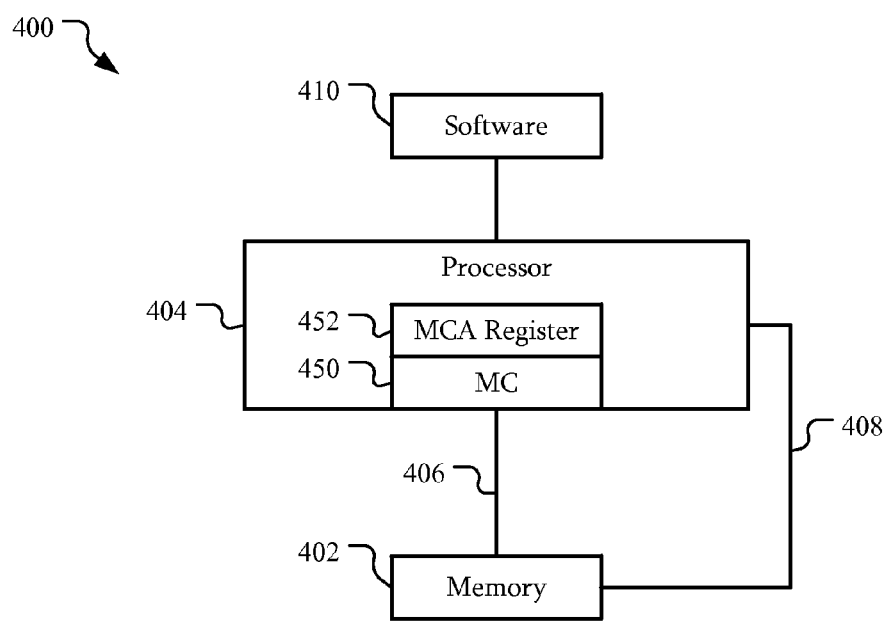
FIG. 4 is a schematic view of a system with a memory system architecture without processor-based error correction according to an embodiment.

FIG. 4 is a schematic view of a system with a memory system architecture without processor-based error correction according to an embodiment. In this embodiment, the system 400 includes a memory 402, a processor 404, communication paths 406 and 408, and software 410 similar to the memory 102, processor 104, communication paths 106 and 108, and software 110 of FIG. 1. However, in this embodiment, the processor 404 includes a memory controller (MC) 450 and a machine check architecture (MCA) register 452.

The memory controller 450 is integrated with the processor 404. The memory controller 450 may be part of a main memory channel that is the main interface between the processor 404 and the memory 402. The memory controller 450 is configured to control access to the data stored in the memory 402 through the communication path 406. In some embodiments, the memory controller 450 may be configured to correct errors, but would not have the opportunity to correct such errors as error correction may have been performed by the memory 402. However, in this embodiment, the memory controller 450 is not configured to correct errors in data read from the memory 402. The memory controller 450 may not be configured to report any error information based on data read from the memory 402.

The MCA register 452 is a register in which hardware errors may be reported. For example, cache errors, bus errors, data errors, or the like may be detected and reported in the MCA register 452. However, because the memory controller 450 is not configured to correct errors in data read from the memory 402, any potential error information based on the data read from the memory 402 may not be reported in the MCA register 452. Regardless, as described above, the error information may be communicated to the processor 404 through the communication path 408. Thus, the error information may still be available to the software 410, albeit not through the memory controller 450 and MCA register 452.

In an embodiment, the availability of error information through the second communication path 408 may allow for a lower cost system 400. For example, a processor 404 with the memory controller 450 without any memory error correction may be used, yet error information may still be available. In particular, even if memory error correction is desired, a processor 404 without memory error correction may be used because the error information is available through the second communication path 408. Thus, the software 410, including any software that uses error information, may still operate as if the processor 404 was capable of memory error correction. A processor 404 without error correction may be a lower power, lower cost processor. Thus, an overall power usage and/or cost of the system 400 may be reduced.

Although the memory controller 450 has been illustrated as being integrated with the processor 404, the memory controller 450 may be separate from the processor 404. Regardless, the communication path 408 may bypass the memory controller 450 and other portions of the processor 404 that may otherwise have had error correction circuitry. The bypass of such components makes the communication of error information through the second communication path 408 substantially independent of the character of the memory controller 450, MCA register 452, or the like. That is, the error information may still be available even though similar information is not available through the memory controller 450 and/or the MCA register 452.

Figure 5:
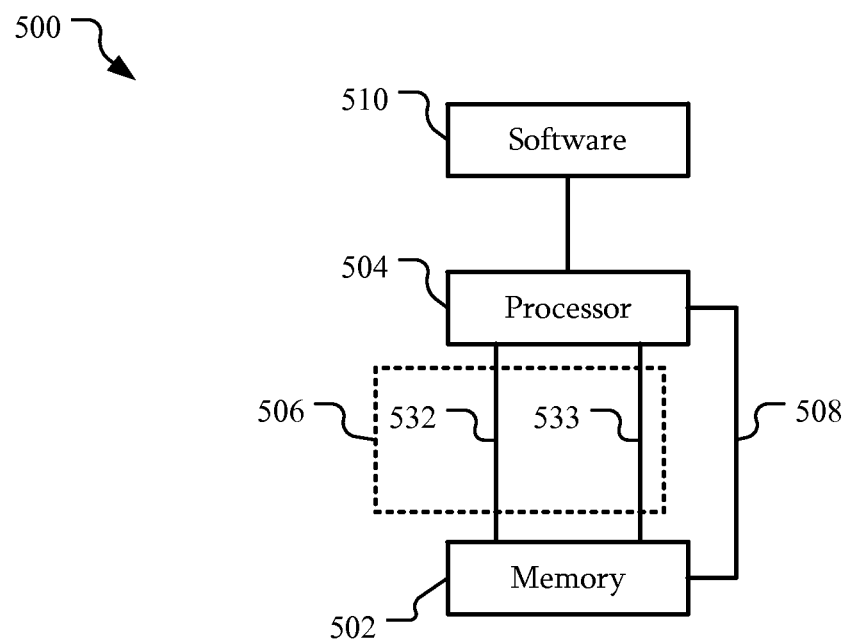
FIG. 5 is a schematic view of a system with a memory system architecture with a poisoned data strobe signal according to an embodiment.

FIG. 5 is a schematic view of a system with a memory system architecture with a poisoned data strobe signal according to an embodiment. In this embodiment, the system 500 includes a memory 502, a processor 504, communication paths 506 and 508, and software 510 similar to the memory 102, processor 104, communication paths 106 and 108, and software 110 of FIG. 1. However, in this embodiment, the communication path 506 includes data lines 532 and a data strobe line(s) 533. Other lines may be present as part of the communication path 506; however, for clarity, those lines are not illustrated.

In an embodiment, error information regarding uncorrectable errors and error information regarding correctible errors may be communicated by different paths. As described above, correctible error information may be communicated through the communication path 508. Uncorrectable error information may include a variety of different types of information based on an uncorrectable error. Uncorrectable error information may be communicated through the first communication path 506. For example, the memory 502 may be configured to communicate an uncorrectable error by a signal transmitted (or not transmitted) over the data strobe line(s) 533. That is, during a normal data transfer, a data strobe signal transmitted over the data strobe line(s) 533 may toggle as data is transferred; however, if the memory 502 has detected an uncorrectable error, the memory 502 may be configured to generate a data strobe signal for transmission over the data strobe line(s) 533 that is different from a data strobe signal during a normal data transfer. In a particular example, the memory 502 may be configured to not toggle the data strobe signal transmitted through the data strobe line(s) 533. When such a condition is detected, the processor 504 may be configured to generate a hardware exception, which may be handled by the software 510.

Although a particular example, of a signal and/or line within the communication path 506 has been used as an example of a technique to communicate an uncorrectable error, other signals and/or lines may be used to communicate an uncorrectable error to the processor 504. Regardless of how communicated, the processor 504 may be configured to respond to such a communication of an uncorrectable error, such as by halting the system 500 or taking another action.

Figure 6:
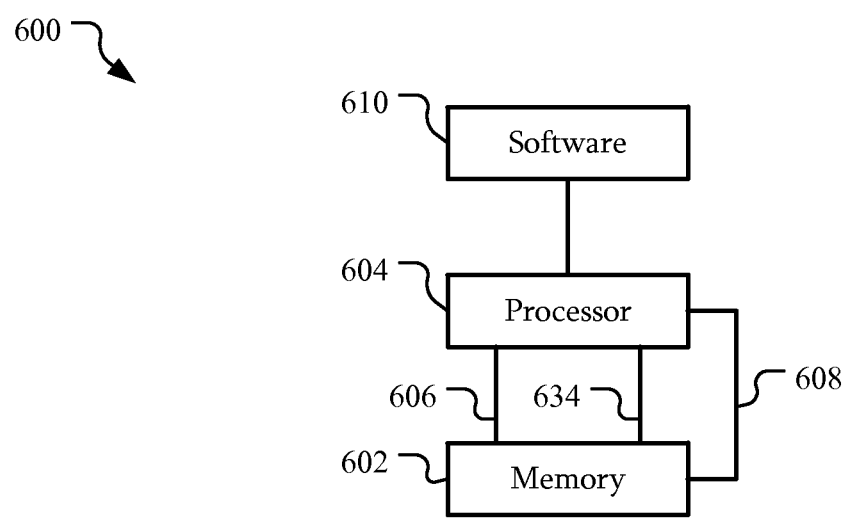
FIG. 6 is a schematic view of a system with a memory system architecture with a separate uncorrectable error signal according to an embodiment.

FIG. 6 is a schematic view of a system with a memory system architecture with a separate uncorrectable error signal according to an embodiment. In this embodiment, the system 600 includes a memory 602, a processor 604, communication paths 606 and 608, and software 610 similar to the memory 102, processor 104, communication paths 106 and 108, and software 110 of FIG. 1. However, in this embodiment, a separate communication path 634 is coupled between the memory 602 and the processor 604.

Similar to the system 500 of FIG. 5, an uncorrectable error may be communicated to the processor 604. In this embodiment, the memory 602 is configured to communicate uncorrectable error information over the third communication path 634. For example, the third communication path 634 may be a dedicated line separate from the first communication path 606. Thus, error information regarding uncorrectable errors may be received by the processor 604, but through a communication path other than the first and second communication paths 606 and 608.

Figure 7:
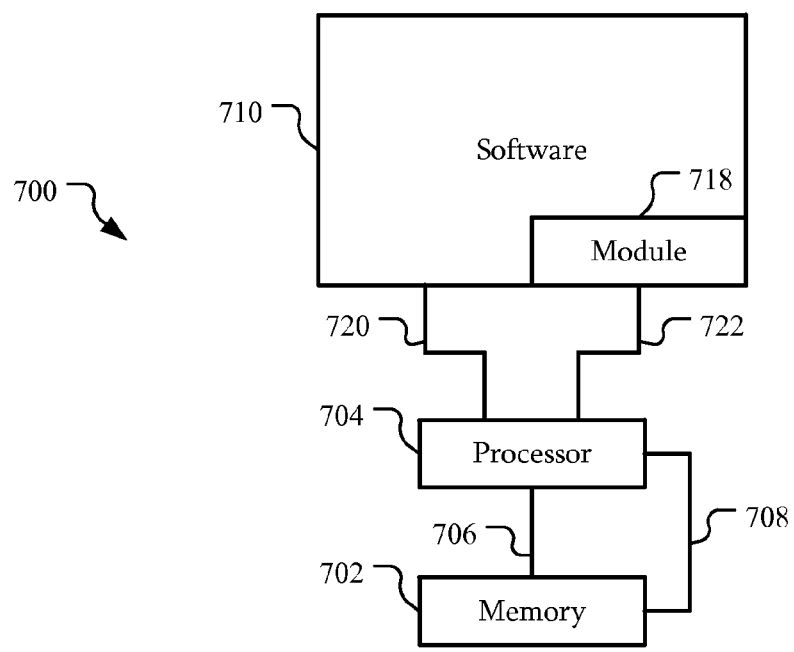
FIG. 7 is a schematic view of a system with a memory system architecture with a software module according to an embodiment.

FIG. 7 is a schematic view of a system with a memory system architecture with a software module according to an embodiment. In this embodiment, the system 700 includes a memory 702, a processor 704, communication paths 706 and 708, and software 710 similar to the memory 102, processor 104, communication paths 106 and 108, and software 110 of FIG. 1. However, in this embodiment, the software 710 includes a module 718.

The module 718 represents a part of the software 710 that is configured to access the error information 722 through the processor. For example, the module 718 may include a kernel module, a driver, an extension, or the like. The module 718 may include a driver for an interface associated with the communication path 708. In a particular example, the module 718 may include a driver associated with an IPMI bus, IPMI2 bus, or the like. Other information 720 may also be available to the software 710. The error information 722 is illustrated separately to indicate what portion of the software 710 is associated with the error information 722.

In an embodiment, the module 718 may cause the processor 704 to request error information from the memory 702. For example, the memory 702 may generate error information. At a later time the processor 704 may transmit a request for the error information through the communication path 708. The memory 702 may be configured to respond to the request with the error information through the communication path 708.

Figure 8:
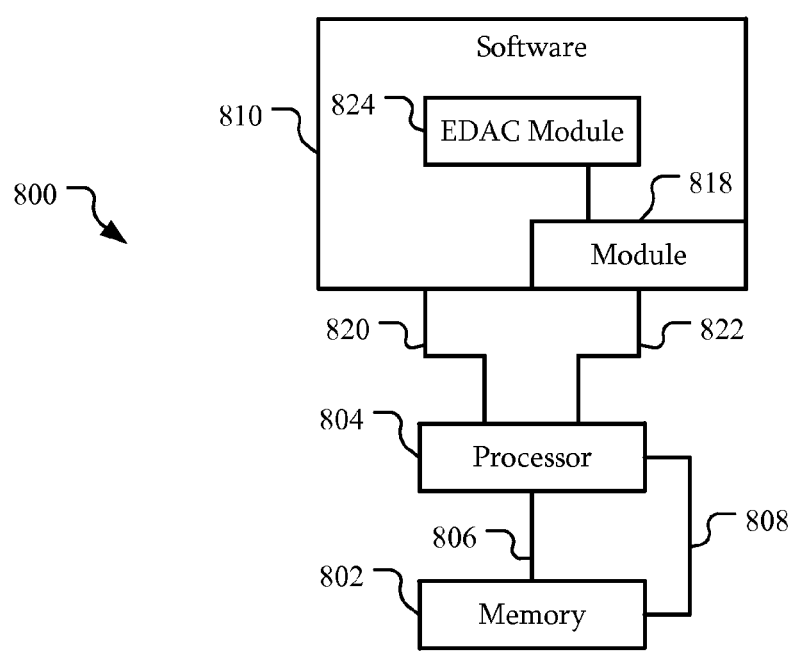
FIG. 8 is a schematic view of a system with a memory system architecture with an error detection and correction module according to an embodiment.

FIG. 8 is a schematic view of a system with a memory system architecture with an error detection and correction module according to an embodiment. In this embodiment, the system 800 includes a memory 802, a processor 804, communication paths 806 and 808, and software 810 with a module 818 responsive to information 820 and 822 similar to the memory 702, processor 704, communication paths 706 and 708, and software 710 with the module 718 responsive to information 720 and 722 of FIG. 7. However, in this embodiment, the software 810 also includes an error detection and correction (EDAC) module 824.

In an embodiment, the EDAC module may be configured to manage error information from memory, caches, input/output (I/O) devices, peripherals, busses, and/or other aspects of the system 800 and may be configured to expose such information to a higher functional layer, such as an application layer. In particular, the EDAC module 824 may be configured to receive the error information from the module 818. The EDAC module 824 may be configured to combine the error information with other information such that other modules, applications, or the like may have access to the error information.

Figure 9:
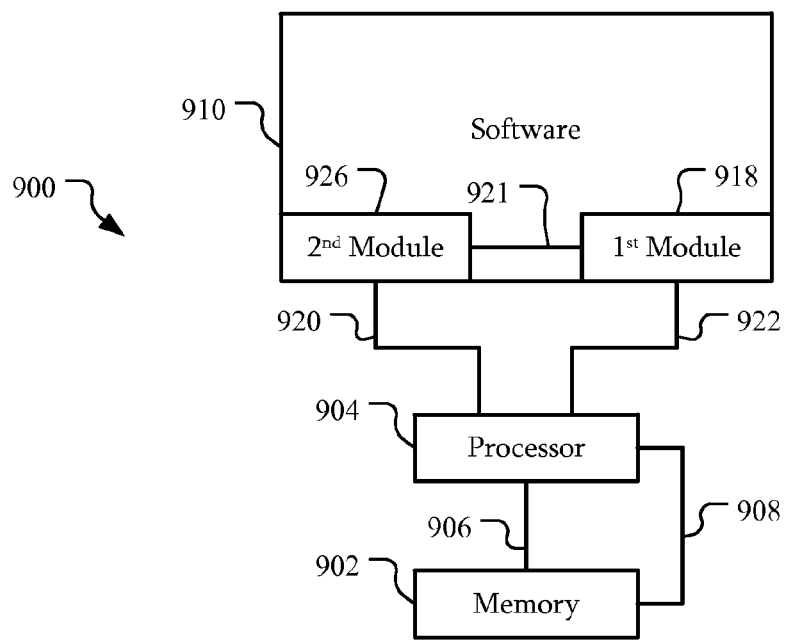
FIG. 9 is a schematic view of a system with a memory system architecture with an aggregating module according to an embodiment.

FIG. 9 is a schematic view of a system with a memory system architecture with an aggregating module according to an embodiment. In this embodiment, the system 900 includes a memory 902, a processor 904, communication paths 906 and 908, and software 910 with a first module 918 responsive to information 920 and 922 similar to the memory 702, processor 704, communication paths 706 and 708, and software 710 with the module 718 responsive to information 720 and 722 of FIG. 7. However, in this embodiment, the software 910 also includes a second module 926. The second module 926 is configured to receive information 920. In particular, this other information 920 may include information unrelated to an error on the memory 902. At least a part 921 of the other information 920 may be received by the first module 918. The first module 918 may be configured to combine the error information 922 with some or all of the other information 920 from the second module 926. The first module 918 may be configured to present the combined information with a single interface. For example, the first module 918 may be configured to present the combined information to an EDAC module, such as the EDAC module 824 of FIG. 8.

Figure 10:
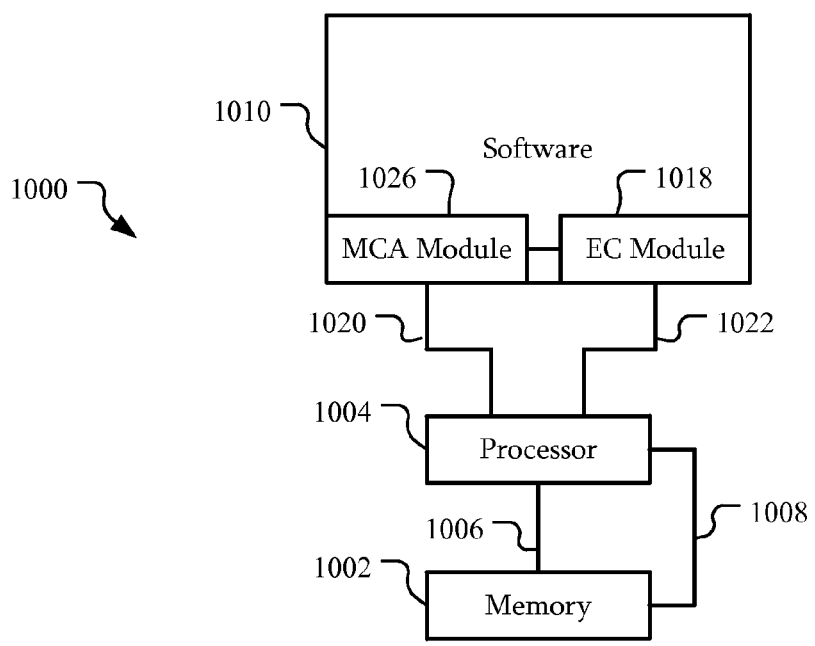
FIG. 10 is a schematic view of a system with a memory system architecture with an error correction module that aggregates information from a memory control architecture module according to an embodiment.

FIG. 10 is a schematic view of a system with a memory system architecture with an error correction module that aggregates information from a memory control architecture module according to an embodiment. In this embodiment, the system 1000 includes a memory 1002, a processor 1004, communication paths 1006 and 1008, and software 1010 with modules 1018 and 1026 responsive to information 1020 and 1022 similar to the memory 902, processor 904, communication paths 906 and 908, and software 910 with the modules 918 and 926 responsive to information 920 and 922 of FIG. 9. However, in this embodiment the module 1018 is an error correction (EC) module 1018 and the second module 1026 is an MCA module 1026.

The MCA module 1026 is configured to control access to MCA registers such as the MCA register 452 of FIG. 4. Information 1020 represents such information from the MCA registers. The EC module 1018 is configured to access the MCA module 1026 to retrieve such information 1020. The EC module 1018 may combine the information 1020 from the MCA module 1026 with the error information 1022 and present that combined information with a single interface.

In particular, the EC module may present an interface similar to or identical to that of an MCA module 1026 had the processor 1004 been able to correct errors. For example, if the processor 1004 was configured to correct errors in data read from the memory 1002 and such error information was available, that information may be available through the MCA module 1026. However, if the processor 1004 is not configured to correct errors in data read from the memory 1002 or the processor 1004 is configured to correct errors but never receives error information by a communication path monitored by the MCA module 1026 due to the errors being corrected in the memory 1002, the MCA module 1026 would not be able to present the error information. Regardless, the EC module 1018 may combine the MCA module 1026 information 1020 with error information 1022 obtained through communication path 1008 and present that combined information similar to or identical to information that the MCA module 1026 would have provided had the processor 1004 been configured to correct errors in data read from the memory 1002 or the error information was available to the MCA module 1026. Software may then use the same or similar interface regardless of whether a processor 1004 with error correction is present. In other words, a processor 1004 capable of error correction is not necessary for software relying upon error information to be fully operational. As a result, costs may be reduced by using a less expensive processor 1004 without error correction.

Figure 11:
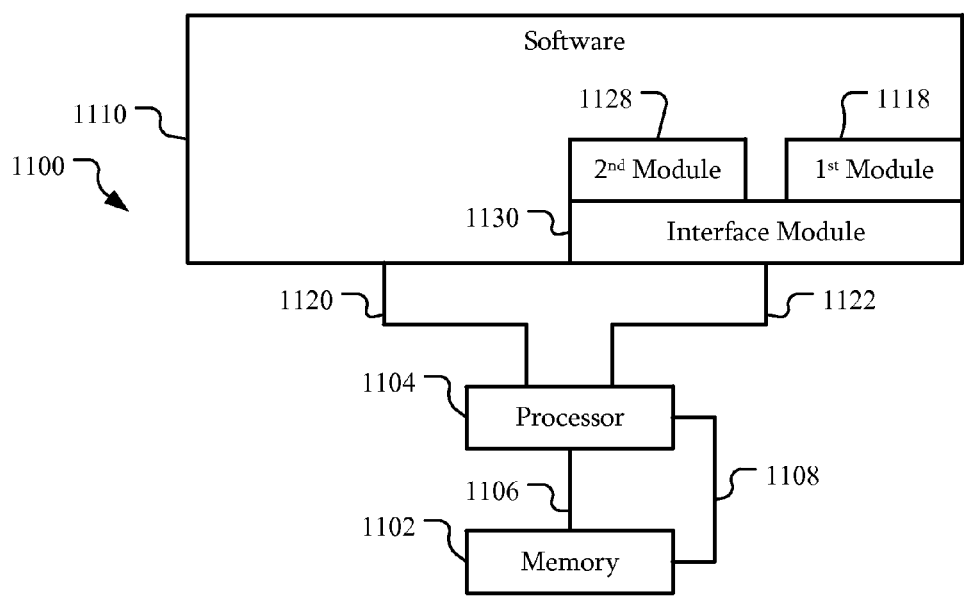
FIG. 11 is a schematic view of a system with a memory system architecture with multiple modules sharing an interface, according to an embodiment.

FIG. 11 is a schematic view of a system with a memory system architecture with multiple modules sharing an interface, according to an embodiment. In this embodiment, the system 1100 includes a memory 1102, a processor 1104, communication paths 1106 and 1108, and software 1110 responsive to information 1120 and 1122 similar to the memory 702, processor 704, communication paths 706 and 708, and software 710 responsive to information 720 and 722 of FIG. 7. However, in this embodiment, the software 1110 includes a first module 1118, a second module 1128 and an interface module 1130.

The first module 1118 is similar to the module 718 of FIG. 7. However, the first module 1118 is configured to receive error information from the memory 1102 through an interface module 1130. The interface module 1130 is a module configured to provide the interface to the communication path 1108. For example, the interface module 1130 may be a module configured to permit access over an IPMI bus.

Other modules, such as the second module 1128 may also be configured to communicate using the interface module 1130. For example, the second module 1128 may be configured to access another device attached to an IPMI bus, access another aspect of the memory 1102, such as thermal or power information, or the like. Both the error information and the other information may be part of the information 1122 transferred by the interface module 1130. In other words, the error information may be transferred using dedicated software along the entire path, but may also share modules, interfaces, busses, or the like with related or unrelated information and/or sources.

Figure 12:
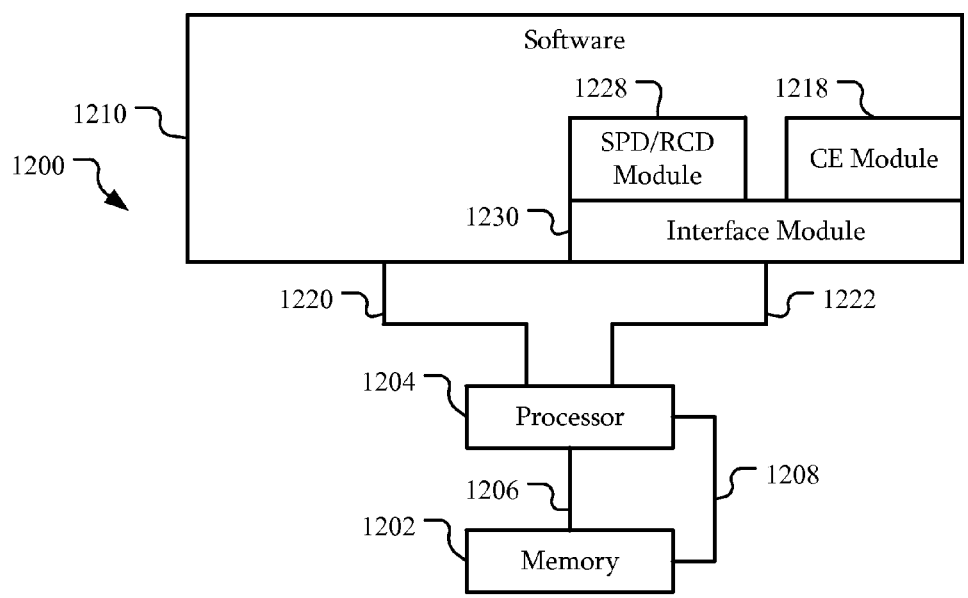
FIG. 12 is a schematic view of a system with a memory system architecture with a correctible error module and a serial presence detect/registering clock driver module sharing an interface according to an embodiment.

FIG. 12 is a schematic view of a system with a memory system architecture with a correctible error module and a serial presence detect/registering clock driver module sharing an interface according to an embodiment. In this embodiment, the system 1200 includes a memory 1202, a processor 1204, communication paths 1206 and 1208, and software 1210 with modules 1218, 1228, and 1230 responsive to information 1220 and 1222 similar to the memory 1102, processor 1104, communication paths 1106 and 1108, and software 1110 with modules 1118, 1128, and 1130 responsive to information 1120 and 1122 of FIG. 11. However, in this embodiment, the first module 1218 is a corrected error (CE) module 1218 and the second module 1228 is a serial presence detect (SPD)/registering clock driver (RCD) module 1228.

In particular, the SPD/RCD module 1228 is configured to access information related to a serial presence detect system and/or a registering clock driver system. The SPD/RCD module 1228 may be configured to access one or both of such systems. The information is accessed through the second communication path 1208. Thus, in an embodiment, the error information from the memory 1202 may be accessed through the same communication path 1208 as SPD/RCD related information.

Figure 13:
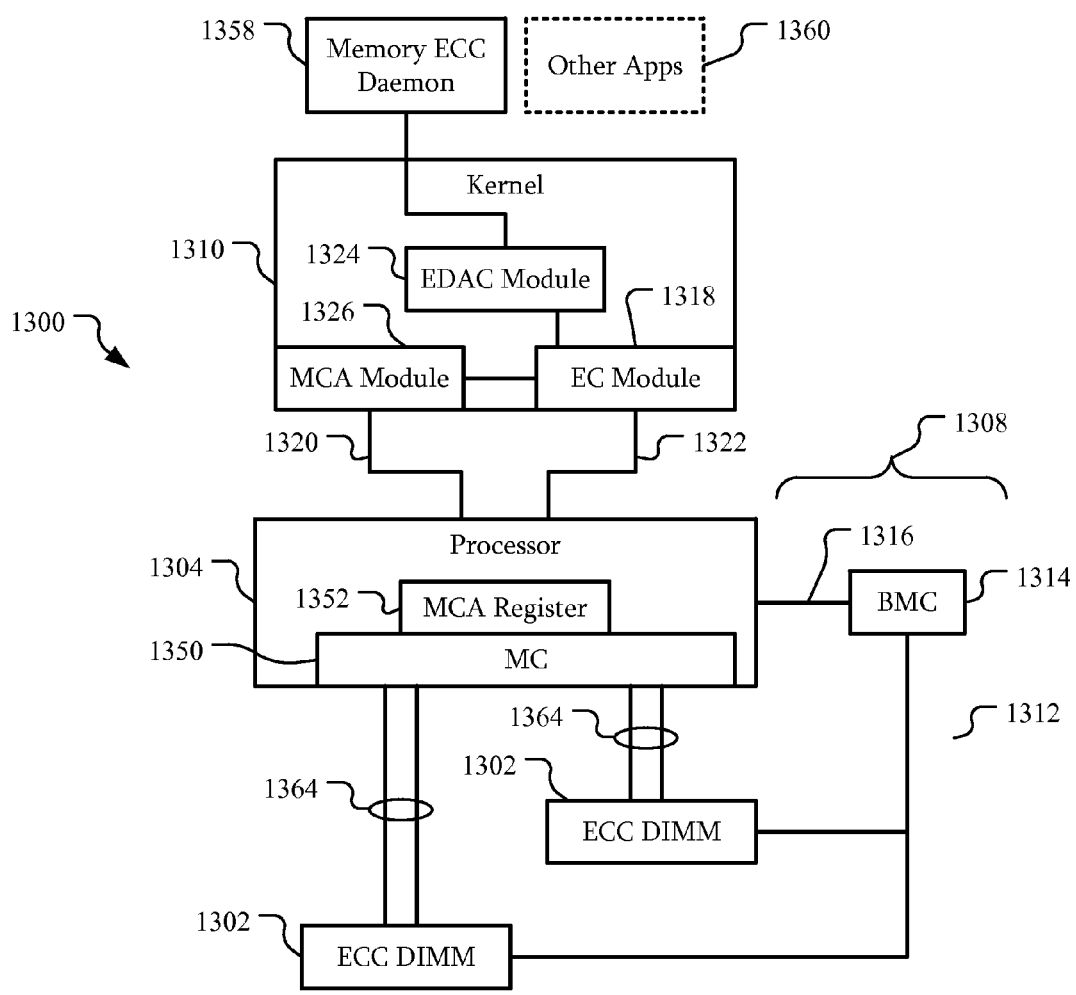
FIG. 13 is a schematic view of a system with a memory system architecture with in-DRAM error correction according to an embodiment.

FIG. 13 is a schematic view of a system with a memory system architecture with in-DRAM error correction according to an embodiment. In this embodiment, the system 1300 includes memories 1302, a processor 1304, kernel 1310 with an EC module 1318 and an MCA module 1326 responsive to information 1320 and 1322 similar to the memory 1002, processor 1004, and software 1010 with the EC module 1018 and MCA module 1026 responsive to information 1020 and 1022 of FIG. 10. However, in this embodiment, each of the memories 1302 is error correction code (ECC) dual in-line memory module (DIMM). Each ECC DIMM 1302 is configured to store data and correct at least an error in the stored data. In this embodiment, the ECC DIMMs 1302 are each coupled to a memory controller (MC) 1350 of the processor 1304 through corresponding communication paths 1364. The communication paths 1364 include at least lines for data signals and data strobe signals or the like similar to the communication path 506 of FIG. 5. The ECC DIMMs 1302 are each coupled to the processor 1304 through a communication path 1308 including a bus 1312, a BMC 1314, and a bus 1316 similar to the bus 312, BMC 314, and bus 316 of FIG. 3.

In an embodiment, the ECC DIMMs 1302 may be configured to correct one or more errors in data read from the ECC DIMMs 1302. The error correction techniques may include a single error correction—double error detection (SEC-DEC) technique, a single-chip chipkill technique, a double-chip chipkill technique, or the like. Any error correction technique may be used.

In this embodiment, the memory controller (MC) 1350 is not configured to perform error correction or alternatively, is not configured to receive error information from the ECC DIMMs 1302. As the data passed from the ECC DIMMs 1302 is already corrected, the MC 1350 may not even receive any information representing a correctible error. However, the error information and, in particular, corrected error information may be transmitted to the processor 1304 through the communication path 1308, i.e., through the busses 1312 and 1316, and the BMC 1314.

In an embodiment, the processor 1304 may be an existing processor that is otherwise not capable of performing error correction, but has an interface capable of connecting to the bus 1316. However, once the processor 1304 is configured by the kernel 1310 and, in particular, the EC module 1318, the overall system 1300 may be configured to perform error correction similar to a system having a processor capable of error correction.

In an embodiment, the EC module 1318 may create a virtual memory controller with ECC interface. For example, as described above, the EC module 1318 may be configured to receive information from the MCA module 1326. That information may be the information that an actual memory controller with ECC interface may provide without some or all error information. The EC module 1318 may supplement the information from the MCA module 1326 with the error information to create a complete set of information expected from a memory controller with ECC interface. As a result, the EDAC module 1324, a memory ECC daemon 1358, other applications 1360, or the like may be used without change from those used with processors with error correction. For example, the EDAC module 1324 may be configured to poll the EC module 1318 for memory ECC information. In return, the EC module 1318 may return the error information received through the second communication path 1308. The memory ECC daemon 1358, in communication with the EDAC module 1324, may poll the EDAC module 1324 for error information. The memory ECC daemon 1358 may then take actions according to the error information at an application level. Such actions may include page retirement, other actions to manage errors to keep the system 1300 running, maintain a level of reliability, recommend decommissioning, or the like.

As described above, an uncorrectable error may be detected. The uncorrectable error information may be communicated through the MC 1350, MCA register 1352, and MCA module 1326 to the EC module 1318. For example, an uncorrectable error may be communicated by a non-maskable interrupt, exception, or the like through the MCA module 1326. In a particular example, the memory controller 1350 may generate a hardware exception in response to an uncorrectable error, regardless of how communicated to the memory controller 1350. The MCA module 1326 may intercept that exception and pass it to the EC module 1318.

The EC module 1318 may then communicate the exception to the EDAC module 1324. In addition to or instead of communicating uncorrectable error information as described above, uncorrectable error information may be communicated through the communication path 1308.

In an embodiment, the ECC DIMMs 1302 may be configured to provide corrected data to the processor 1304. However, the data may become corrupted between the ECC DIMMs 1302 and the MC 1350. Accordingly, some form of error correction may be performed between the ECC DIMMs 1302 and the processor 1304 or MC 1350. For example, the data transmitted from the ECC DIMMs 1302 may be encoded with error correction codes intended to detect errors that occur over the communication link 1364. With such error correction, substantially the entire path from storage element in the ECC DIMMs 1302 to the processor may be protected with error correction.

Figure 14A:
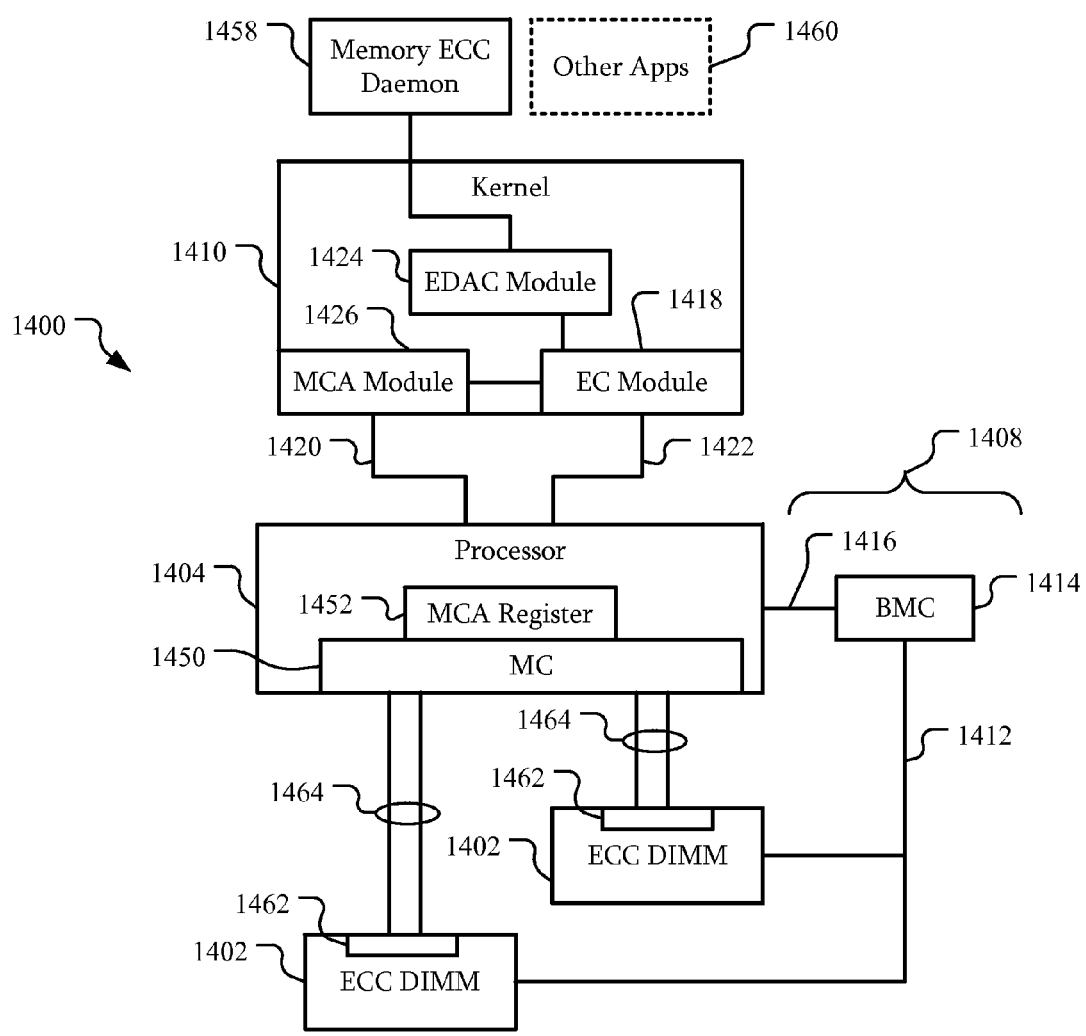
FIGS. 14A-D are schematic views of systems with a memory system architecture with in-module error correction according to some embodiments.

FIGS. 14A-D are schematic views of systems with a memory system architecture with in-module error correction according to some embodiments. Referring to FIG. 14A, the system 1400 includes components similar to those of FIG. 13; however, in this embodiment, the ECC DIMMs 1402 include a buffer 1462. The buffer 1462 is configured to correct errors in data read from the corresponding ECC DIMM 1402. In particular, uncorrected data may be read from internal memory devices, such as DRAM devices (not illustrated) of the ECC DIMM 1402. The buffer 1462 may be configured to correct the uncorrected data and generate corrected error information similar to other memories described herein. That error information may be communicated through the communication path 1408, and may be used as described above. That is, the error information may be used as described above regardless of how the error information is generated.

Figure 14B:
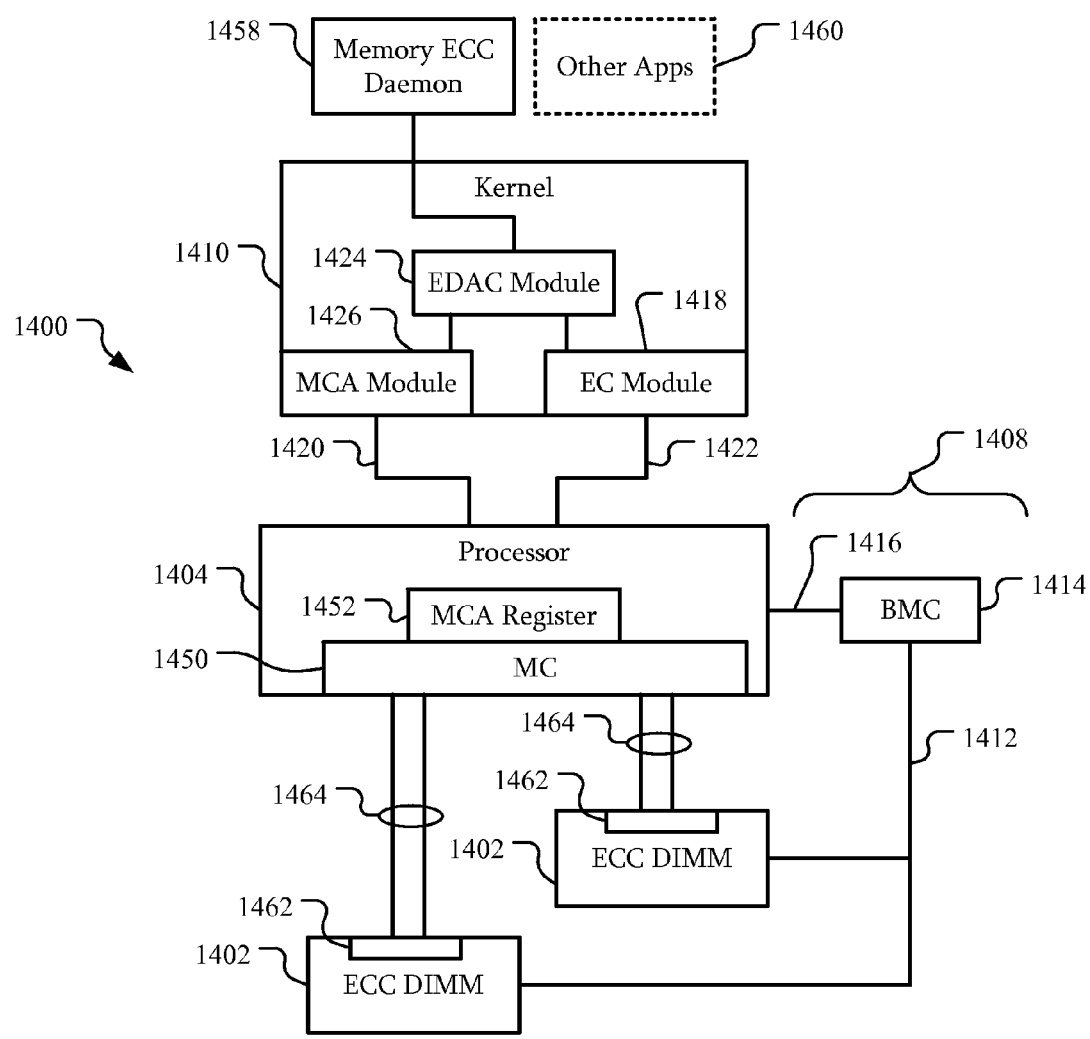

Referring to FIG. 14B, the components of the system 1400 may be similar to those of FIG. 14A. However, in this embodiment, the EDAC module 1424 is configured to communicate with the MCA module 1426. For example, the EDAC module 1424 may be configured to poll the MCA module 1426 for hardware related information, uncorrectable error information, or other information available through the MCA module 1426 as described above. The EDAC module 1424 may be configured to combine the information from the MCA module 1426 with information from the EC module 1418.

Figure 14C:
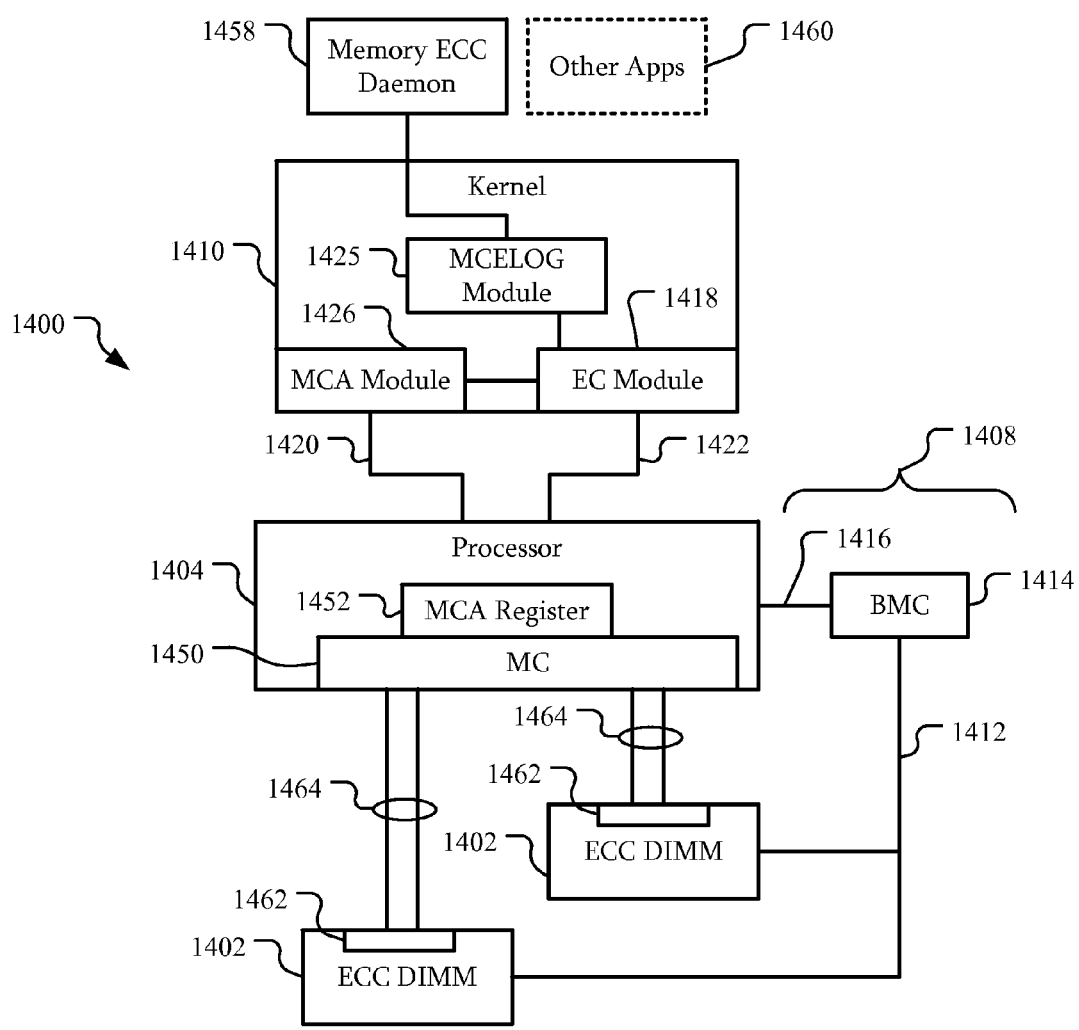

Referring to FIG. 14C, the components of the system 1400 may be similar to those similar to those of FIG. 14A. However, in this embodiment, an MCELOG module 1425 is configured to receive information from the CE module 1418. The MCELOG module 1425 may be configured to record machine check events (MCEs) related to various system errors, such as memory errors, data transfer errors, or other errors. The MCELOG module 1425 may be configured to raise an interrupt to the Memory ECC Daemon 1458 and pass error information to the Memory ECC Daemon 1458.

Figure 14D:
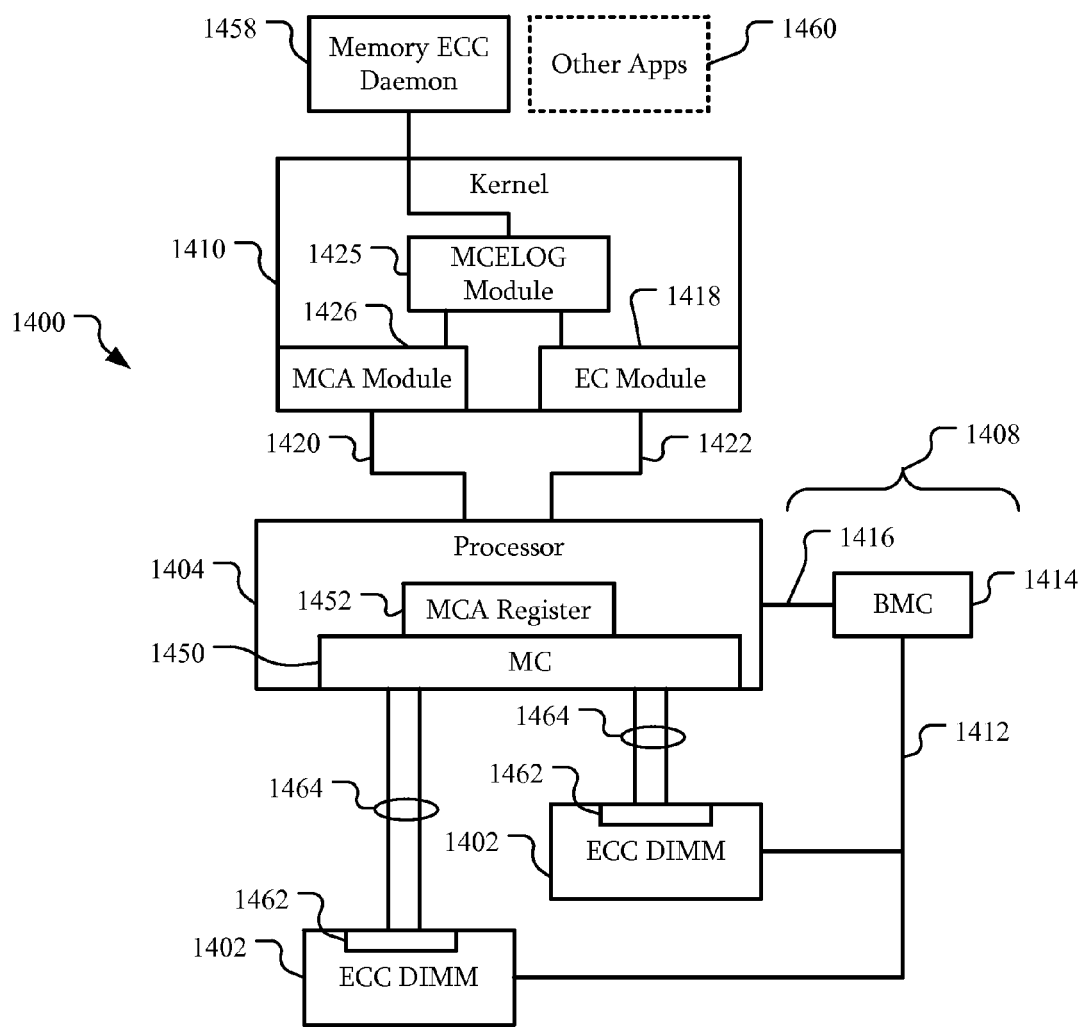

Referring to FIG. 14D, the components of the system 1400 may be similar to those of FIG. 14C. However, in this embodiment, similar to the difference between FIGS. 14A and 14B, the MCELOG module 1425 may be configured to receive information from the MCA module 1426 similar to the EDAC module 1424 of FIG. 14B.

Although different modules have been described with respect to ECC DIMMs 1402 with buffers 1462 in FIGS. 14A-D, in other embodiments, the various configurations may be applied to the system 1300 of FIG. 13 with ECC DIMMs 1302.

Figure 15:
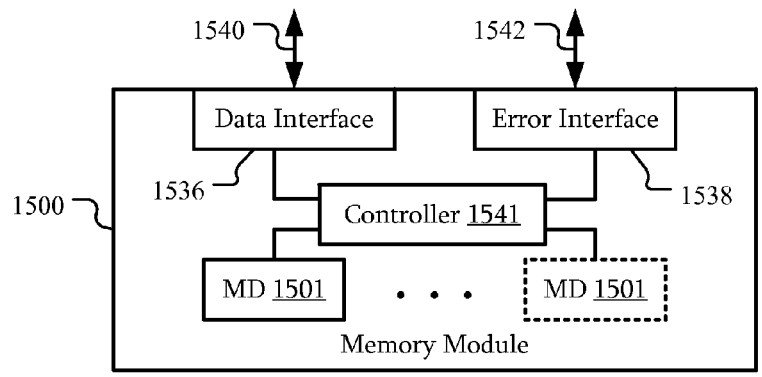
FIG. 15 is a schematic view of a memory module according to an embodiment.

FIG. 15 is a schematic view of a memory module according to an embodiment. The memory module 1500 includes one or more memory devices 1501, a data interface 1536, an error interface 1538, and a controller 1541. The data interface 1536 is configured to transmit and receive data 1540 from data stored in the memory devices 1501. The memory module 1500 is configured to generate error information for data read from the one or more memory devices 1501. The error interface 1542 is configured to transmit error information generated in response to correcting an error in data read from the one or more memory devices 1501.

The data interface 1536 is the interface through which data stored in the memory devices 1501 is transmitted and the interface through which data 1540 to be stored in the memory devices 1501 is received. For example, the data interface 1536 may include buffers, drive circuits, terminations, or other circuits for lines such as data lines, strobe lines, address lines, enable lines, clock lines, or the like The error interface 1538 may be an interface configured to communicate over a particular bus, such as SMBus, IPMI, or other buses as described herein. In an embodiment, the error interface 1538 may be an existing interface through which the memory module 1500 communicates other information in addition to the error information. Thus, the information 1542 would include not only the error information, but also the other information.

The controller 1541 is coupled to the memory devices 1501, the data interface 1536, and the error interface 1538. The controller 1541 is configured to obtain the error information. In an embodiment, the controller 1541 may obtain the error information from the memory devices 1501; however, in other embodiments, the controller 1541 may be configured to correct errors in data from the memory devices 1501 and generate the error information.

In an embodiment the controller 1541 may be configured to communicate an uncorrectable error through the data interface 1536. For example, as described above, a data strobe signal may be used to indicate an uncorrectable error. The controller 1541 may be configured to modify the data strobe signal transmitted through the data interface 1536 in response to detecting an uncorrectable error.

Figure 16:
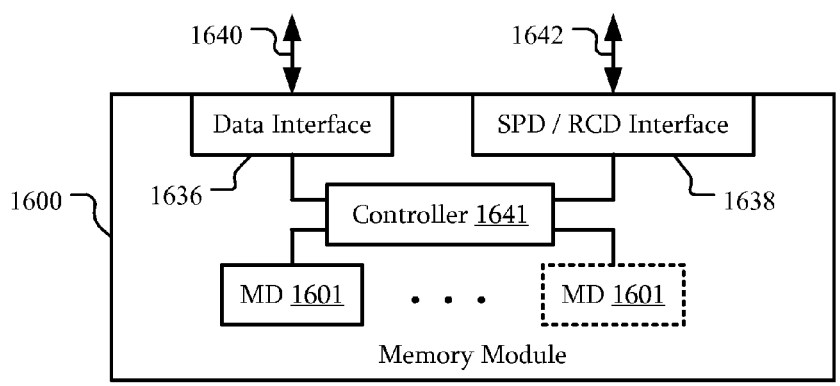
FIG. 16 is a schematic view of a memory module with an SPD or RCD interface according to an embodiment.

FIG. 16 is a schematic view of a memory module with an SPD or RCD interface according to an embodiment. In this embodiment, the memory module 1600 includes one or more memory devices 1601, a data interface 1636, an error interface 1638, and a controller 1641 similar to the one or more memory devices 1501, data interface 1536, error interface 1538, and controller 1541 of FIG. 15. However, the error interface 1538 of FIG. 15 is an SPD/RCD interface 1638 here.

The SPD/RCD interface 1638 may be used to provide access to an SPD system or an RCD system (not illustrated). In a particular embodiment, the error information may be available through a particular register or memory location within such an SPD or RCD system. Thus, the error information may be obtained through the same interface the SPD or RCD information may be obtained.

As the error information is available through an existing hardware interface, additional hardware may not be needed. For example, a command received through the SPD/RCD interface 1638 intended to access error information may be different from other commands by an address, register address, or other field unused by SPD/RCD systems. In an embodiment, a new register for SPD/RCD systems may be defined that exposes the error information. In another embodiment, an existing register may be reused to communicate the error information.

Figure 17:
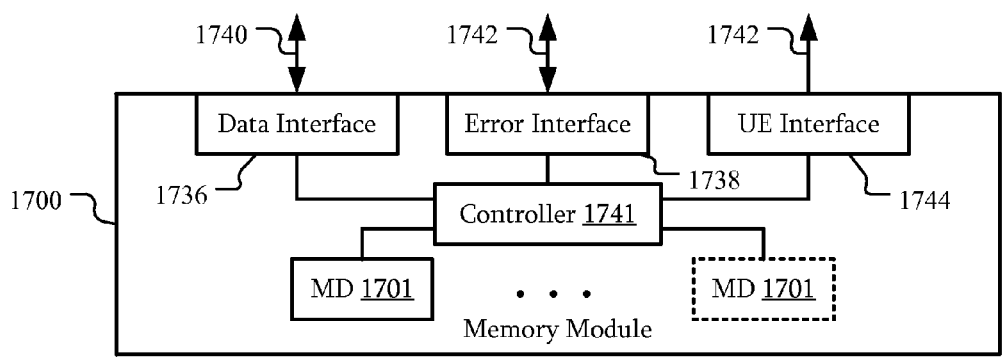
FIG. 17 is a schematic view of a memory module with a separate uncorrectable error interface according to an embodiment.

FIG. 17 is a schematic view of a memory module with a separate uncorrectable error interface according to an embodiment. In this embodiment, the memory module 1700 includes one or more memory devices 1701, a data interface 1736, an error interface 1738, and a controller 1741 similar to the one or more memory devices 1501, the data interface 1536, the error interface 1538, and the controller 1541 of FIG. 15. However, the memory module 1700 also includes an uncorrectable error (UE) interface 1744.

The UE interface 1744 is a separate interface through which the memory module 1700 is configured to communicate uncorrectable errors. For example, the UE interface 1744 may be a dedicated line, a dedicated bus, or the like.

Figure 18:
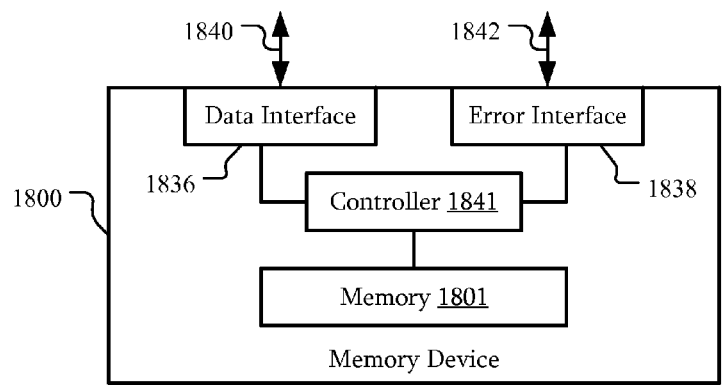
FIG. 18 is a schematic view of a memory device according to an embodiment.

FIG. 18 is a schematic view of a memory device according to an embodiment. In this embodiment, the memory device 1800 includes a data interface 1836 and an error interface 1838. The data interface 1836 and the error interface 1838 may be similar to the data interface 1536 and the error interface 1538 of FIG. 15, or the like as described above; however, in this embodiment, the data interface 1836 and the error interface 1838 are interfaces to the memory device 1800 rather than a memory module, such a memory module 1500 of FIG. 15.

The memory device 1800 includes a controller 1841. The controller 1814 may be any device configured to be operatively coupled to the memory 1801 and the interfaces 1836 and 1838. For example, the controller 1841 may include a general purpose processor, a digital signal processor (DSP), an application specific integrated circuit, a programmable logic device, or the like The memory 1801 is configured to store data. For example, the memory 1801 may be a memory cell array; however, in other embodiments, the data may be stored in other configurations. The memory 1801 may include electrical, magnetic, chemical, optical, or other types of storage elements.

The controller 1841 is configured to transmit data stored in the memory 1801 through the data interface 1836. The controller may also be configured to receive data to be stored in the memory 1801 through the data interface 1836. Such transfers are represented by data 1840.

The controller 1841 is configured to transmit error information generated in response to correcting an error in data read from memory 1801 through the error interface 1838. The error information may be similar to any of the types of error information described above. The controller 1841 may also be configured to receive commands, instructions, or other information through the error interface 1838. Such transfers of error information, commands, instructions, or other information is represented by information 1842.

In this embodiment, both the data 1840 and information 1842 are illustrated as passing through the controller 1841. However, in other embodiments, components of the memory device 1800 may be controlled by the controller 1841 such that data 1840 and information 1842 does not pass through the controller 1841. For example, in some embodiments, the data and/or error information may be provided to the data interface 1836 and error interface 1838 under control of the controller 1841, but bypassing the controller 1841.

Figure 19:
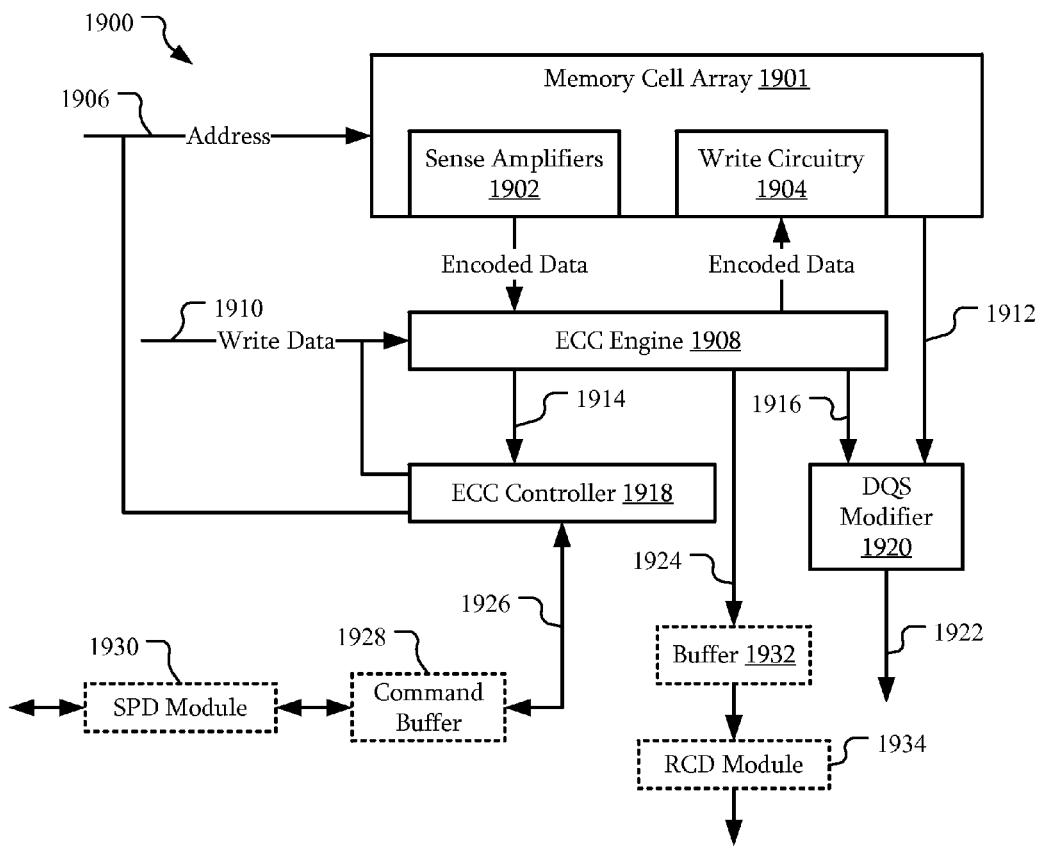
FIG. 19 is a schematic view of a memory device according to another embodiment.

FIG. 19 is a schematic view of a memory device according to another embodiment. In this embodiment, the memory device 1900 includes a memory cell array 1901. The memory cell array 1901 may include memory cells in which data is stored. In particular, the memory cell array 1901 may be configured to store encoded data. Sense amplifiers 1902 and write circuitry 1904 are examples of circuitry in the memory device 1900 that allows data to be written to and read from the memory cell array 1901 to an address or addresses specified by the address 1906. However, in other embodiments, other read and write circuitry may be associated with the memory cell array 1901. Furthermore, although the sense amplifiers 1902 and write circuitry 1904 are illustrated as part of the memory cell array 1901, such circuitry may be separate from the memory cell array 1901. In addition, although a single memory cell array 1901 is illustrated, multiple memory cell arrays 1901 may be present.

The memory cell array 1901 is coupled to an error correcting code (ECC) engine 1908. The ECC engine 1908 is configured to correct at least one error in data read from the memory by encoding data written to the memory cell array 1901 and decoding data read from the memory cell array 1901. In particular, the ECC engine 1908 may be configured to receive write data 1910. The ECC engine 1908 may be configured to encode the write data 1910 such that the encoded data may be written to the memory cell array 1901 by the write circuitry 1904 to a location specified by the address 1906. Similarly, the ECC engine 1908 may be configured to receive encoded data read from the memory cell array 1901 and decode that data into decoded output data 1924. Such encoding and decoding may be performed according to any number of ECC algorithms as described herein. As an example, Single Error Correct-Double Error Detect (SEC-DED) may be used as the ECC algorithm; however others may be used.

Although signals such as an address 1906 and write data 1910 are illustrated as signals used in writing data to the memory cell array 1901, the memory device 1900 may be configured to receive and process other signals involved in writing data to the memory cell array 1901; however, such components are omitted for clarity. Furthermore, other components that may modify an address 1906, redirect an access, or the like may be present, but are also not illustrated for clarity.

In a particular example, during a write operation, the ECC Engine 1908 is configured to receive the bits the memory device 1900 should store as the write data 1910. The ECC Engine 1908 is configured to calculate the ECC bit value(s) for the write data 1910 and pass these ECC bit(s), along with the original data values as the encoded data, to the memory cell array 1901 using the write circuitry 1904. The memory cell array 1901 is then configured to store the encoded data.

During a read operation, the ECC Engine 1908 is configured to receive encoded data from the memory cell array 1901. That is, the sense amplifiers 1902 and other circuitry are used to read the previously stored ECC bit(s) and original data values as the encoded data. The ECC engine 1908 may then decode the encoded data, generate output data 1924, and generate any error information.

The output data 1924 may then be output from the memory device 1900. In some embodiments, other components may be disposed between the ECC engine 1908 and the output of the memory device 1900. In an embodiment, a buffer 1932 may be configured to buffer the output data 1924. In another embodiment, an RCD module 1934 may be configured to receive, buffer, and output the output data 1924. Here, examples of such optional components are illustrated with dashed lines.

The ECC engine 1908 is also configured to generate error flags. For example, the ECC engine 1908 may be configured to generate a correctable error (CE) flag. The CE flag may be set when the ECC engine 1908 successfully corrects an n-bit error, where n is less than or equal to a number of bit-errors that the ECC engine 1908 is configured to correct.

The ECC engine 1908 may also be configured to generate an uncorrectable error (UE) flag. The UE flag may be set when the ECC engine 1908 detects that a number of bit-errors have occurred greater than a number of bit-errors that the ECC engine 1908 is configured to correct. In a particular example, with SEC-DED, the CE flag may indicate that a single-bit error has been corrected while the UE flag may indicate that a two-bit error has occurred.

The ECC controller 1918 is configured to manage the error correction and associated error information. The ECC controller 1918 is configured to receive error information 1914 from the ECC engine. The error information 1914 may include information indicating whether there was no error, a correctable error, an uncorrectable error, a number of errors, or the like. The ECC controller 1918 may also be configured to receive the address 1906 associated with a read. Accordingly, the ECC controller 1918 may combine the error information 1914 from the ECC engine 1908 into new error information with the address 1906. As will be described in further detail below, the ECC controller 1918 may be configured to generate write data 1910 to be encoded by the ECC engine 1908 and written to the memory cell array 1901.

In an embodiment, the ECC controller 1918 may include a memory configured to store error information. For example, the ECC controller 1918 may include multiple registers in which error information may be stored. Any variety of error information may be stored in the ECC controller 1918. As will be described in further detail below, records of the error may be stored including information about an error. For example, the error record may include information such as address information, type of error, the data read from the memory cell array 1901, whether a repair or other action has been performed, or the like.

In an embodiment, the ECC controller 1918 may be configured to transmit and receive communications 1926 from external devices. For example, the communications 1926 may include the transmission of error information. When a correctable error or an uncorrectable error occurs, error information may be transmitted by the ECC controller 1918. Such transmission may be in response to a request from an external device or may be spontaneous, such as according to a regular schedule, on the occurrence of the error, during a refresh cycle, or the like.

In an embodiment, the ECC controller 1918 may be configured to communicate over a bus, such as the SMBus to communicate the error information. In some embodiments, the memory device 1900 may include a command buffer 1928. The command buffer 1928 may be configured to buffer commands received through a bus for the ECC controller 1918.

In an embodiment, the memory device 1900 may include an SPD module 1930. The ECC controller 1918 may be configured to communicate with the SPD module 1930. The SPD module 1930 may be configured to perform operations associated with an SPD interface. In addition, the SPD module 1930 may be configured to allow access to the error information available through the ECC controller 1918. For example, particular commands received through at SPD module 1930 may be translated into appropriate commands and/or signals to access the error information stored in the ECC controller 1918.

DQS modifier 1920 is configured to modify a data strobe signal 1912 from the memory cell array 1901 in response to error information 1916 from the ECC engine 1908 and output the modified data strobe signal 1922. In a particular embodiment, the error information 1916 is a signal indicating whether an uncorrectable error has occurred. The DQS modifier 1920 may be configured to modify the data strobe signal 1912 such that the output data strobe signal 1922 does not toggle if the error information 1916 indicates that an uncorrectable error has occurred, but passes the data strobe signals 1912 as is if an uncorrectable error signal has not occurred. For example, the DQS modifier 1920 may include logic circuitry such as an OR gate, an AND gate, a NAND gate, a transmission gate or the like.

In an embodiment, the DQS modifier 1920 may be used to communicate time-sensitive information. For example, when an uncorrectable error has occurred, that error may be associated with a current read operation. While information regarding the uncorrectable error may be communicated by the ECC controller 1918 to external devices, such as by an SMBus, the communication path may be slower than a communication path for the data 1924. Thus, communication of the occurrence of the uncorrectable error may be delayed relative to the corresponding read operation. In contrast, communicating that an uncorrectable error has occurred by the DQS modifier 1920 may be substantially contemporaneous with the corresponding read operation. That is, the modified output data strobe signal 1922 is the data strobe signal associated with the transfer of data 1924 with the uncorrectable error.

Although particular components of a memory device 1900 have been used as an example, other components may be present. For example, the memory device 1900 may be configured to receive and/or transmit various strobe signals, selection signals, control signals, enable signals, or the like.

Figure 20:
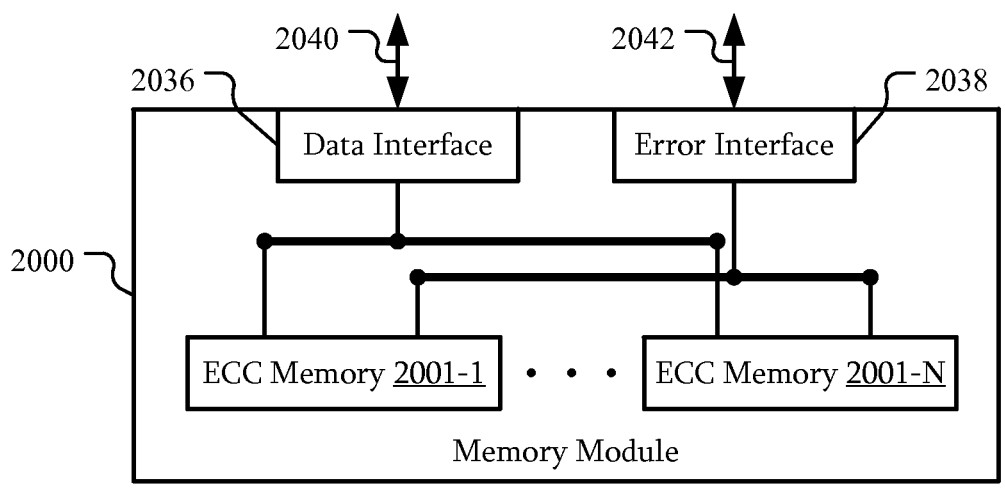
FIG. 20 is a schematic view of a memory module including memory devices according to an embodiment.

FIG. 20 is a schematic view of a memory module including memory devices according to an embodiment. In this embodiment, the memory module 2000 includes a data interface 2036 and an error interface 2038 similar to data interface 1536 and error interface 1538 of FIG. 15. However, in this embodiment, the memory module 2000 includes multiple ECC memory devices 2001-1 to 2001-N. The ECC memory devices 2001 may be any of the memory devices described herein, such as the memory devices 1800 and 1900 of FIGS. 18 and 19 described above.

Using memory device 1800 as an example of the memory devices 2001 and referring to FIGS. 18 and 20, each of the memory devices 1800 is coupled to the data interface 2036 and the error interface 2038. With respect to the data interface 2036, the data interfaces 1836 of the memory devices 1800 may form at least part of the data interface 2036. For example, data I/Os, strobe signals, or the like of each data interface 1836 may be aggregated into the data interface 2036. Address inputs and/or other control signals of the data interface 2036 may be distributed to the data interfaces 1836 of the memory devices 1800. Accordingly, data may be communicated to and from the memory devices 1800 through the data interface 2036 and hence, to and from the memory module 2000.

Similarly, the error interfaces 1838 may be coupled to the error interface 2038. The error interfaces 1838 may be coupled in a variety of ways. For example, the error interfaces 1838 and the error interface 2038 may be coupled to a common bus within the memory module 2000. In another example, the error interface 2038 may be coupled directly to each error interface 1838 of the memory devices 2001. The error interface 2038 may be configured to aggregate the error information from the memory devices 1800. Accordingly, error information may be communicated from the memory devices 1800 through the error interface 2038 and hence, from the memory module 2000.

Although the memory device 1800 of FIG. 18 has been used as an example of a memory device 2001 of the memory module 2000, in other embodiments, different memory devices may be used. For example, the memory device 1900 of FIG. 19 may be used as the memory devices 2001. Referring to FIG. 19, the address 1906, write data 1910, output data 1924, data strobe signal 1922, or the like of each memory device 1900 may be coupled to the data interface 2036. Similarly, the ECC controller 1918 of each memory device 1900 may be coupled to the error interface 2038.

Figure 21:
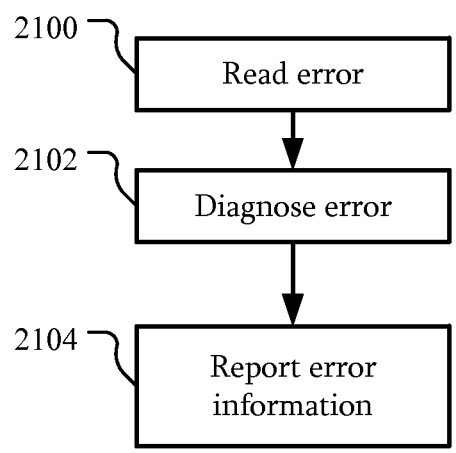
FIG. 21 is a flowchart of a technique of communicating error information according to an embodiment.

FIG. 21 is a flowchart of a technique of communicating error information according to an embodiment. In 2100, a read error in a memory device occurs. In response, in 2102, the error is diagnosed. As will be described in further detail, not only may the error be identified, but other corrective action make be taken to repair the error.

In 2104, the error information is reported. As described above, a communication link between the memory device, other components of a memory module, and a processor may be used to communicate error information. Reporting of the error information 2104 may use such communication links.

Figure 22:
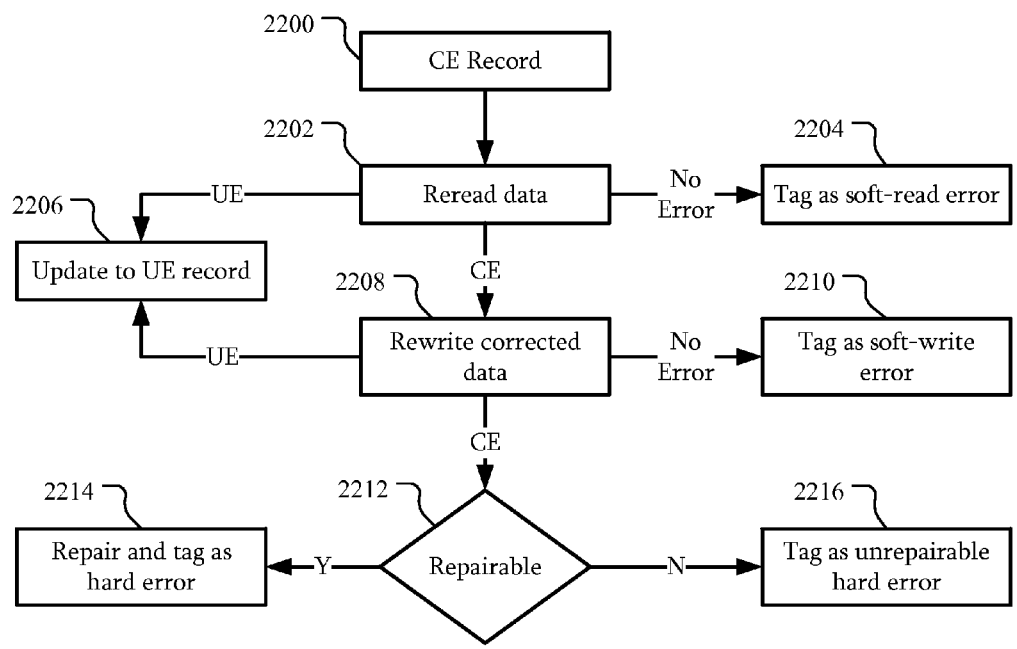
FIG. 22 is a flowchart of a technique of handling errors according to an embodiment.

FIG. 22 is a flowchart of a technique of handling errors according to an embodiment. This embodiment is an example of how a correctable error is handled, for example, how a correctable error is handled by the ECC controller 1918 of FIG. 19. In particular, after a correctable error (CE) has occurred, a CE record is created in 2200. The CE record can include a variety of different information related to the error as described above.

In 2202, the data is reread. In this embodiment, there are three possible outcomes, no error occurs, a CE occurs, or an uncorrectable error (UE) occurs in response to rereading the data. If no error occurs, in 2204 the error record is tagged as a soft-read error. If a CE occurs, the corrected data is rewritten in 2208. If an UE occurs, the error record is updated to an uncorrectable error record in 2206.

As part of rewriting the corrected data in 2208, an error may occur. If no error occurs, in 2210 the error record is tagged as a soft-write error. If a UE occurs, the error record is updated to an uncorrectable error record in 2206.

If a CE occurs, in 2212, a determination is made whether the memory cell is repairable. In a particular embodiment, a CE at this stage may indicate that the error cannot be repaired by rewriting. Accordingly, the error may be caused by a hardware error. Depending on the outcome of the determining whether the memory cell is repairable in 2212, the error record is further annotated and may be repaired. If the memory cell is repairable, in 2214, the memory cell is repaired and the error is tagged as a hard error. If the memory cell is not repairable, in 2216, the error record is tagged as an unrepairable hard error. Accordingly, by the above described diagnosis, the error may be further categorized and/or repaired.

Although rewriting in 2208 has been used as an example of an operation that may indicate a UE, CE, or no error, such information may be the result of other operations. For example, after rewriting the data in 2208, a read may be performed and similar error information may be generated.

Figure 23:
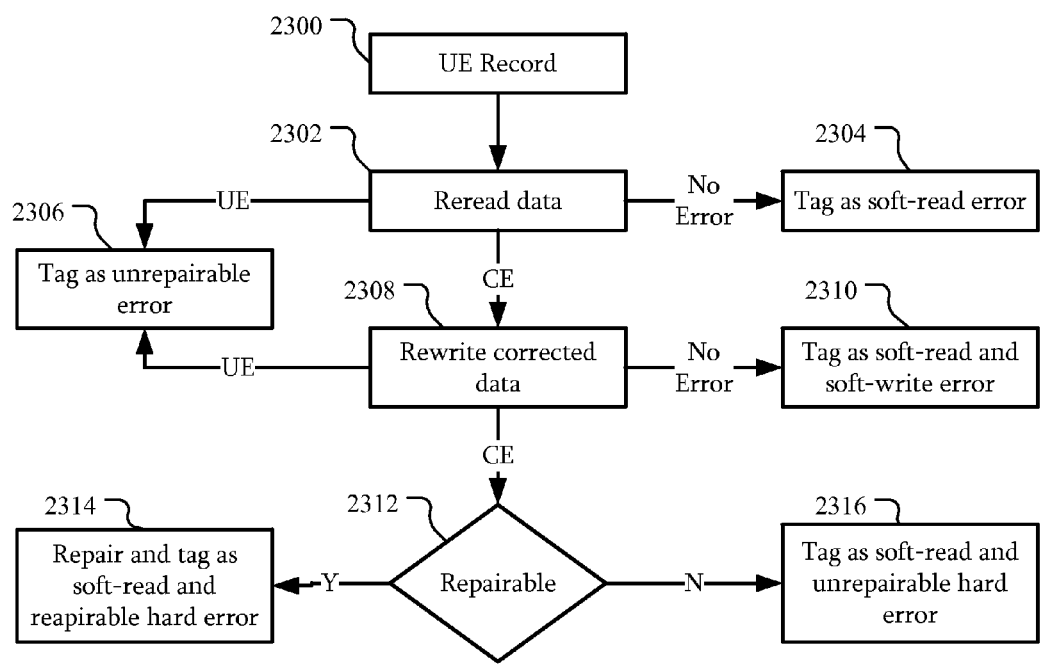
FIG. 23 is a flowchart of a technique of handling errors according to another embodiment.

FIG. 23 is a flowchart of a technique of handling errors according to another embodiment. This embodiment is an example of how an uncorrectable error is handled, for example, how an uncorrectable error is handled by the ECC controller 1918 of FIG. 19. In particular, after an uncorrectable error has occurred, a UE record is created in 2300. In some embodiments, the UE record may be a result of an update to a UE record in 2206 as described with respect to FIG. 22.

In 2302, the data associated with the UE record may be reread. In response, different operations may be performed. If a UE occurs after rereading, in 2306, the record is tagged as an unrepairable error. If no error occurs, the record is tagged as a soft-read error in 2304. If a CE occurs, corrected data is rewritten in 2308. Similar to the rewriting in 2208 of FIG. 22, the result generated from the operation may come from other sources, such as rereading the data after rewriting.

In response to a result of rewriting the data, different operations may be performed. If the result is a UE, the record is tagged as an unrepairable error in 2306. If no error occurs, the record is tagged as a soft-read and soft-write error in 2310.

If the result is a CE, in 2312, a determination is made whether the memory cell is repairable. If the memory cell is repairable, in 2314, the repair is performed and the record is tagged as a soft-read and repairable hard error. If the memory cell is not repairable, in 2316, the record is tagged as a soft-read and unrepairable hard error.

Although various categorizations of errors have been described above, in some embodiments, all of such information may not be available external to the memory device. For example, particular types of errors, such as the soft-read and soft-write errors of FIG. 22 may be aggregated as soft-errors. Any aggregation, summarizing, or the like may be performed to generate error information to be transmitted from the memory device. Moreover, the memory device may be configurable to provide a particular level of detail.

In an embodiment, using techniques such as those described in FIGS. 22 and 23, the memory device may be configured to perform error management techniques such as soft-error recovery (e.g. memory scrubbing), hard-error repair, or the like. Information related to such operations may also be available in the error information provided by a memory device.

In an embodiment, the above described operations may be performed after a read has occurred. In particular, the operations may be configured to not block a read operation. However, once an appropriate period occurs, such as a maintenance interval, a refresh cycle, or the like, the error records may be processed, updated, memory cells repaired, or the like.

Although particular sequences of errors have been used as examples of criteria to categorize errors or repair memory cells, in other embodiments, different sequences may be used. For example, referring to FIG. 22, in that embodiment, determining whether a memory cell is repairable in 2210 occurs if a CE occurs, followed by CE when rereading in 2202 and followed by a CE when rewriting in 2208. However, in other embodiments, determining whether a memory cell is repairable in 2210 may occur only if the rereading in 2202 resulted in a CE after multiple rereading attempts. That is, in some embodiments, the particular criteria to categorize the errors may be different that the examples described above.

Furthermore, although particular designations of error types have been used, in some embodiments, all of such error types need not be used. Similarly, in some embodiments, different error types may be used.

FIG. 24 is a flowchart of a technique of communicating error information according to an embodiment. In this embodiment, a read error when reading data from a memory occurs in 2400. In response, error information may be generated. For example, a read error may be a correctable error that was corrected. The error information may be information about that correctable error. In another example, the read error may be multiple errors. The error information may be information about those errors.

In 2402, a read error command is received. In an embodiment, a read error command may be received by a memory module. If an error has occurred, the memory may transmit the error information in 2404. Before receiving a read error command in 2402, the memory module may store error information on errors that have occurred. That error information regarding earlier errors may be transmitted in 2404 in response to the read error command. However, if an error has not occurred, the transmission of error information in 2404 may be transmission of information indicating that an error has not occurred.

As described above, error information may be transmitted over a bus. In particular, the bus may be an out-of-band path relative to a main data path of the memory module. Accordingly, the transmitting in 2404 may include transmitting the error information over the bus.

Figure 24A:
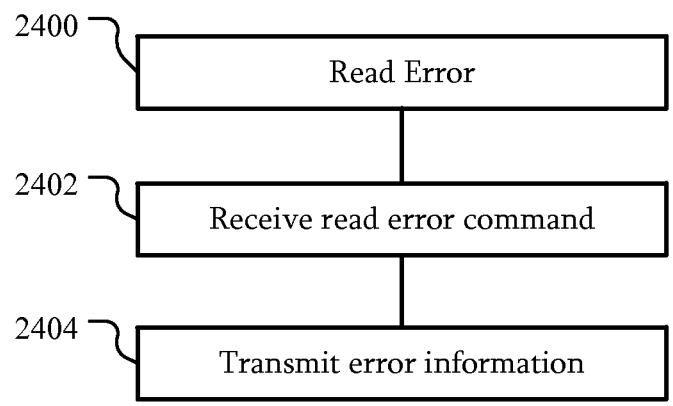
FIG. 24A is a flowchart of a technique of communicating error information according to another embodiment.
Figure 24B:
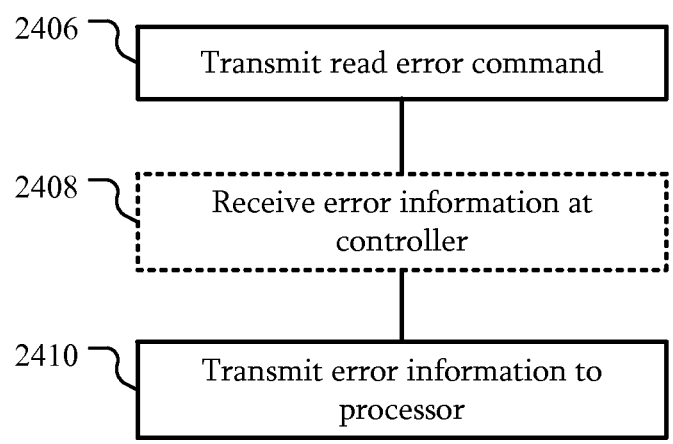
FIG. 24B is a flowchart of a technique of communicating error information according to another embodiment.

FIG. 24B is a flowchart of a technique of communicating error information according to another embodiment. Referring to FIGS. 24A and 24B, in an embodiment, the operations of FIG. 24B may be operations of a controller. In particular, a read error command may be transmitted in 2406 from the controller. The read error command transmitted in 2406 may be the read error command received in 2402. As described above, in 2404, error information may be transmitted. That error information may be received at the controller in 2408. For example, a controller may be configured to poll a memory module. Thus, the controller may transmit the read error command in 2406 and receive the error information at the controller in 2408. As described above, the controller may have a memory, such as non-volatile memory, in which the controller may store the error information. At a later time, the error information may be transmitted to a processor in 2410.

Although the use of a controller to transmit the read error command has been used as an example, in another embodiment, a processor may transmit the read error command in 2406. That read error command may be received by the memory module in 2402 and the error information may be transmitted to the processor in 2410. That is, the error information may, but need not be received and/or processed in a controller.

Figure 25:
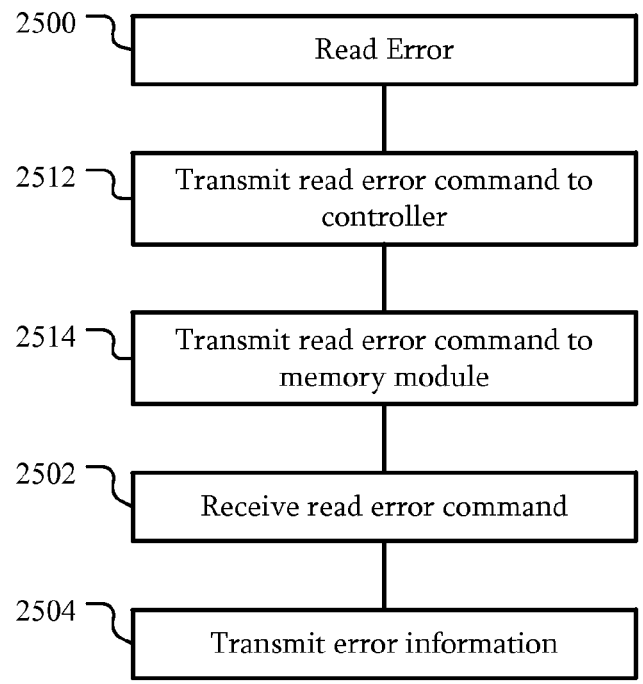
FIG. 25 is a flowchart of a technique of communicating error information according to another embodiment.

FIG. 25 is a flowchart of a technique of communicating error information according to another embodiment. In this embodiment, a read error may occur in 2500. A read error command is transmitted to a controller in 2512. For example, the controller may receive the read error command from a processor. In 2514, a read error command is transmitted to a memory module. For example, the controller may forward the read error command received from the processor on to the memory module, modify the read error command, create a different read error command for the memory module, or the like to transmit a read error command to the memory module in 2514. The read error command transmitted in 2514 may be received in 2502, and error information may be transmitted in 2504 similar to operations 2402 and 2404 of FIG. 24A, respectively. Error information may be propagated to the processor as described above.

As described above, a controller may poll a memory module for error information and store that error information. Accordingly, when a read error command is received by a controller from a processor, the controller may already have read error information. The controller may transmit the stored error information to the processor. The controller may, but need not poll the memory module for more error information before the controller transmits the stored error information to the processor.

Figure 26:
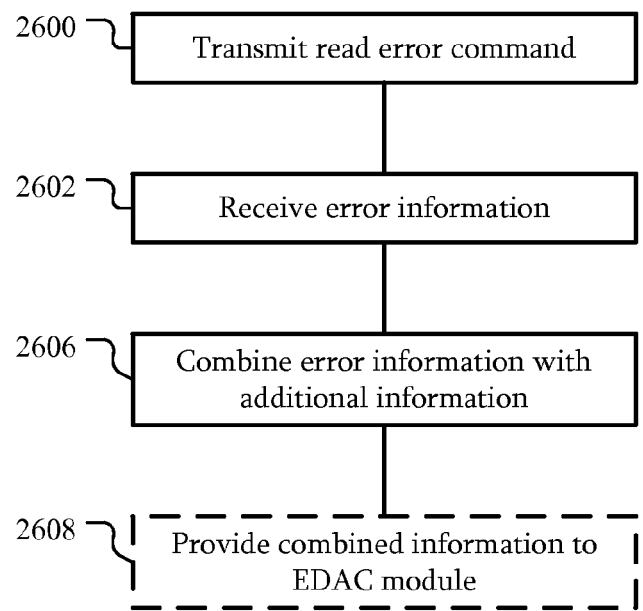
FIG. 26 is a flowchart of a technique of communicating error information according to another embodiment.

FIG. 26 is a flowchart of a technique of communicating error information according to another embodiment. In an embodiment, a processor may transmit a read error command in 2600. In response, the processor may receive error information in 2602. In 2606, the processor may combine the error information with additional information. As described above, additional information may be any information, such as a status of the processor, peripherals, busses, or the like, including information unrelated to the memory module. In a particular example, the processor may combine the error information with information from a MCA module.

In a particular embodiment, in 2608, the combined information may be provided to an EDAC module. As described above, the EDAC module may make information regarding errors of various systems available to higher level applications.

Figure 27:
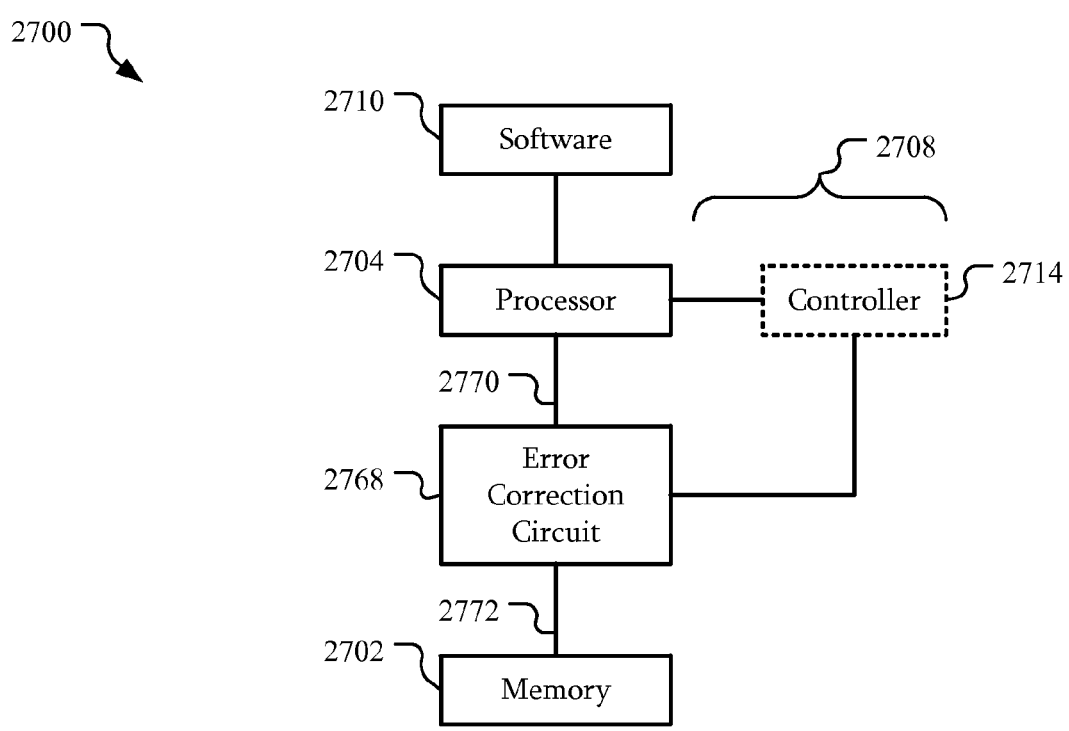
FIG. 27 is a schematic view of a system with a memory system architecture according to an embodiment.

FIG. 27 is a schematic view of a system with a memory system architecture according to an embodiment. In this embodiment, the system 2700 includes a processor 2704 and software 2710 similar to the processor 104 and software 110 of FIG. 1. However, in this embodiment, the system 2700 includes a memory 2702 and an error correction circuit 2768.

In this embodiment, the memory 2702 is not configured to correct errors. The memory is coupled to the error correction circuit 2768 and is configured to transmit data to the error correction circuit through communication path 2772.

The error correction circuit 2768 is configured to correct errors in data received from the memory 2702. The error correction circuit 2768 is coupled to the processor 2704 through a second communication path 2770 and a third communication path 2708. The second communication path 2770 is the main path through which the processor 2704 is configured to receive data. For example, the second communication path 2770 may be a system bus for the processor 2704.

In contrast, the third communication path 2708 is similar to the communication path 108 or the like described above. That is, the third communication path 2708 may be a separate, out-of-band communication path, include a controller 2714, or have other variations similar to the communication paths described above.

Figure 28:
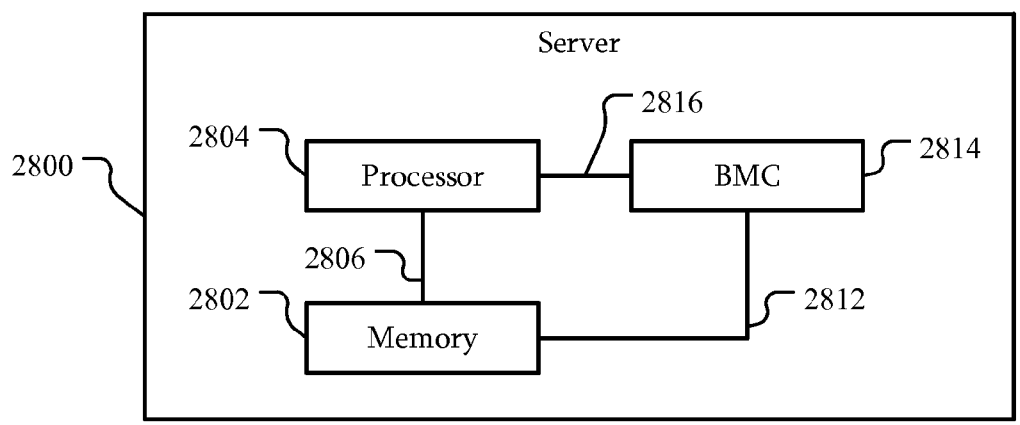
FIG. 28 is a schematic view of a server according to an embodiment.

FIG. 28 is a schematic view of a server according to an embodiment. In this embodiment, the server 2800 may include a stand-alone server, a rack-mounted server, a blade server, or the like. The server 2800 includes a memory 2802, a processor 2804, and a BMC 2814. The processor 2804 is coupled to the memory 2802 through the communication path 2806. The BMC is coupled to the processor 2804 through the bus 2816 and coupled to the memory 2802 through the bus 2812. The memory 2802, processor 2804, BMC 2814, communication path 2806, and busses 2812 and 2816 may be any of the above described corresponding components.

Figure 29:
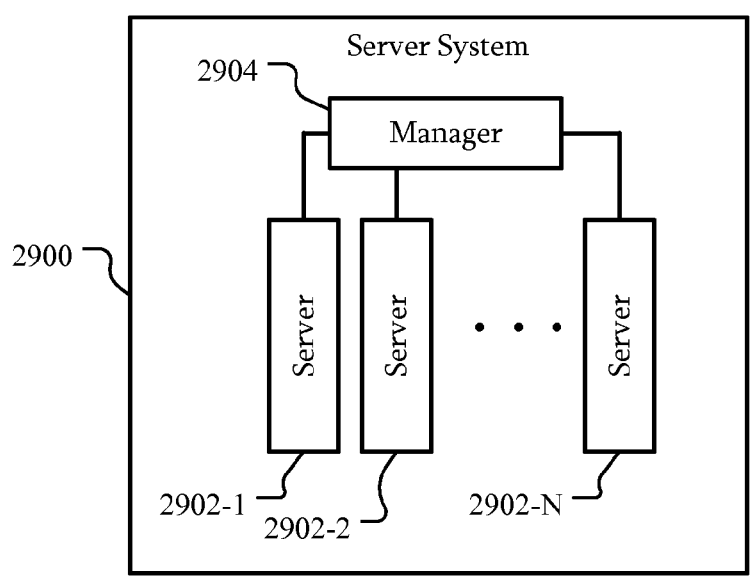
FIG. 29 is a schematic view of a server system according to an embodiment.

FIG. 29 is a schematic view of a server system according to an embodiment. In this embodiment, the server system 2900 includes multiple servers 2902-1 to 2902-N. The servers 2902 are each coupled to a manager 2904. One or more of the servers 2902 may be similar to the server 2700 described above. In addition, the manager 2904 may include a system with a memory system architecture as described above.

The manager 2904 is configured to manage the servers 2902 and other components of the server system 2900. For example, the manager 2904 may be configured to manage the configurations of the servers 2902. Each server 2902 is configured to communicate error information to the manager

2904. The error information may include correctible error information communicated to a processor in one of the servers 2902 as described above or other error information based on the correctible error information. The manager 2904 may be configured to take actions based on that error information. For example, server 2902-1 may have a number of correctible errors that exceeds a threshold. The manager 2904 may be configured to transfer the functions of that server 2902-1 to server 2902-2 and shutdown server 2902-1 for maintenance and/or replacement. Although a particular example has been given, the manager 2904 may be configured to take other actions based on the error information.

Figure 30:
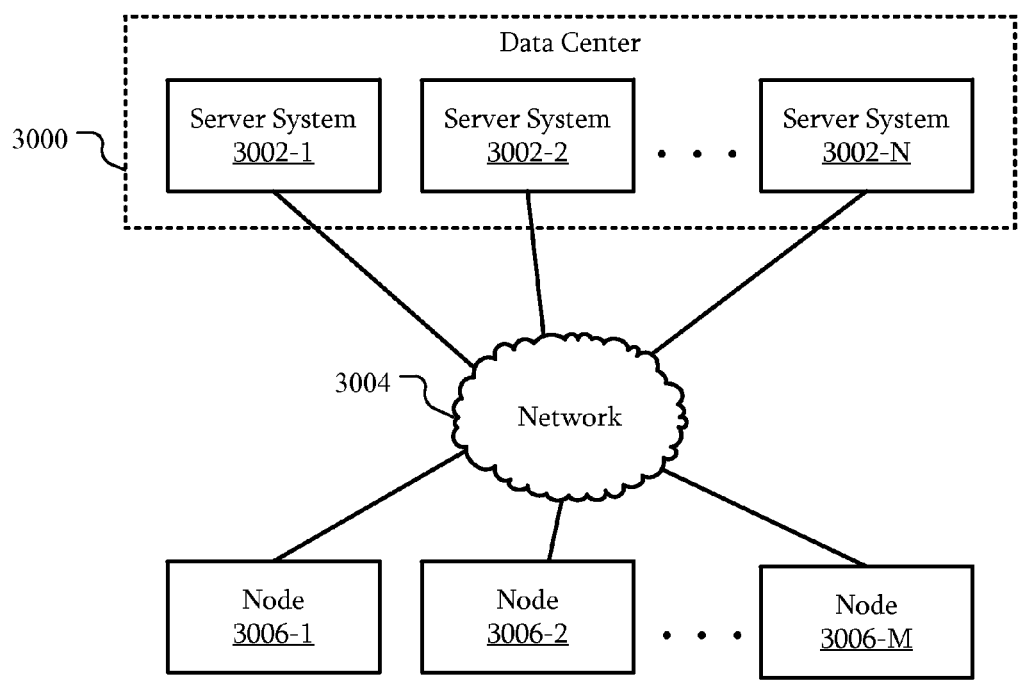
FIG. 30 is a schematic view of a data center according to an embodiment.

FIG. 30 is a schematic view of a data center according to an embodiment. In this embodiment, the data center 3000 includes multiple servers systems 3002-1 to 3002-N. The server systems 3002 may be similar to the server system 2800 described above in FIG. 28. The server systems 3002 are coupled to a network 3004, such as the Internet. Accordingly, the server systems 3002 may communicate through the network 3004 with various nodes 3006-1 to 3006-M. For example, the nodes 3006 may be client computers, other servers, remote data centers, storage systems, or the like.

An embodiment includes a system, comprising: a memory configured to store data, correct an error in data read from the stored data, and generate error information in response to the correcting of the error in the data read from the stored data; and a processor coupled to the memory through a first communication path and a second communication path and configured to: receive data from the memory through the first communication path; and receive the error information from the memory through the second communication path.

In an embodiment, the error is a single-bit error; and the error information indicates that an error was corrected.

In an embodiment, the error information includes corrected error information; and the processor is configured to receive the corrected error information through a path other than the first communication path.

In an embodiment, the memory is a dynamic random access memory module.

In an embodiment, the system further comprises: a controller coupled to the processor and the memory and configured to communicate with the processor and the memory. The controller is part of the second communication path.

In an embodiment, the controller is a baseboard management controller.

In an embodiment, the controller is coupled to the processor by an interface compliant with intelligent platform management interface (IPMI).

In an embodiment, the controller is coupled to the memory by an interface compliant with System Management Bus (SMBus).

In an embodiment, the controller is configured to: store the error information; and provide the error information to the processor in response to a request received from the processor.

In an embodiment, the processor includes a memory controller coupled to the memory; and the memory controller is coupled to the memory through the first communication path.

In an embodiment, the processor includes a memory controller coupled to the memory; and the memory controller is not configured to correct errors in data read from the memory.

In an embodiment, the first communication path includes a plurality of data lines and at least one data strobe line; and the memory is configured to communicate an uncorrectable error by a signal transmitted over the at least one data strobe line.

In an embodiment, the system further comprises: a third communication path coupled between the memory and the processor. The memory is configured to communicate an uncorrectable error over the third communication path.

In an embodiment, the processor is configured to request the error information generated by the memory.

In an embodiment, the processor is configured to combine the error information with other information associated with the memory.

In an embodiment, the other information is based on information received through the first communication path.

In an embodiment, the processor includes an interface coupled to the second communication path; and the processor is further configured to: receive the error information through the interface; and receive other information through the interface.

In an embodiment, the memory includes at least one of a serial presence detect system and a registering clock driver system; and the other information is received from the at least one of the serial presence detect system and the registering clock driver system.

An embodiment includes a memory module, comprising: at least one memory device configured to store data; a first interface; and a second interface. The first interface is configured to transmit data stored in the at least one memory device; and the second interface is configured to transmit error information generated in response to correcting an error in data read from the at least one memory device.

In an embodiment, the second interface includes at least one of a serial presence detect interface and a registering clock driver interface.

In an embodiment, the memory module further comprises a controller coupled to the first interface and configured to modify a data strobe signal transmitted through the first interface in response to detecting an uncorrectable error.

In an embodiment, the second interface is further configured to transmit error information in response to detecting an uncorrectable error.

An embodiment includes a method, comprising: reading, at a memory module, data including an error; generating error information based on reading the data including the error; receiving, at memory module, a command to read the error information; and transmitting, from the memory module, the error information in response to the command.

In an embodiment, the method further comprises receiving, at a controller, the error information; and transmitting, from the controller to a processor, the error information.

In an embodiment, the method further comprises: transmitting, from a controller, the command to read error information; and receiving, at the controller, the error information.

In an embodiment, the command to read error information is referred to as a first command to read error information, the method further comprising: receiving, from a processor at a controller, a second command to read error information; and transmitting, from the controller, the first command in response to the second command.

In an embodiment, the method further comprises communicating, from the memory module, an uncorrectable error by modifying a data strobe signal.

In an embodiment, the method further comprises generating, at a processor, additional information associated with the memory module; and combining, at the processor, the additional information with the error information.

In an embodiment, transmitting, from the memory module, the error information comprises transmitting the error information and other information over a communication link.

In an embodiment, the other information is unrelated to the memory module.

An embodiment includes a system, comprising: a memory; a processor coupled to the memory through a main memory channel; and a communication link separate from the main memory channel and coupled to the memory and the processor; wherein the memory and processor are configured to communicate with each other through the main memory channel and the communication link.

In an embodiment, the processor comprises a memory controller; and the memory controller is part of main memory channel.

In an embodiment, the processor is configured to receive system management information through the communication link.

In an embodiment, the system management information comprises at least one of thermal information and power information.

In an embodiment, the memory is configured to communicate error information to the processor through the communication link.

An embodiment includes system, comprising: a memory without error correction; an error correction circuit coupled to the memory, configured to correct an error in data read from the memory, and configured to generate error information in response to the error; and a processor coupled to the error correction circuit through a first communication path and a second communication path. The processor is configured to receive corrected data from the error correction circuit through the first communication path; and the processor is configured to receive the error information from the error correction circuit through the second communication path.

In an embodiment, the second communication path includes a controller configured to receive the error information from the error correction circuit and transmit the error information to the processor.

An embodiment includes a method, comprising: reading, at a memory device, data including an error in response to a read command received through a data interface; recording error information based on reading the data including the error; and transmitting, from the memory module, the error information through a error interface.

In an embodiment, the method further comprises rereading the data read from memory in response to the error and identifying the error in response to rereading the data.

In an embodiment, the method further comprises identifying the error as uncorrectable if the reread data indicates an uncorrectable error.

In an embodiment, the method further comprises identifying the error as unrepairable if the reread data indicates an uncorrectable error and the error was an uncorrectable error.

In an embodiment, the method further comprises identifying the error as a soft-read error if the reread data indicates no error.

In an embodiment, the method further comprises rewriting corrected data to the memory in response to the error being a correctable error.

In an embodiment, the method further comprises if an uncorrectable error occurs during the rewrite, identifying the error as an uncorrectable error.

In an embodiment, the method further comprises if no error occurs during the rewrite, identifying the error as a soft-write error.

In an embodiment, the method further comprises if a correctable error occurs during the rewrite, attempting to repair the memory.

In an embodiment, the method further comprises identifying the error based on the outcome of the attempt to repair the memory.

In an embodiment, the method further comprises communicating, from the memory module, an uncorrectable error by modifying a data strobe signal.

An embodiment includes a memory module, comprising: a data interface; an error interface; a plurality of memory devices, each memory device coupled to the data interface and the error interface and comprising: a memory configured to store data; a controller coupled to the data interface, the error interface, and the memory; wherein: the controller is configured to transmit data stored in the memory through the data interface; and the controller is configured to transmit error information generated in response to correcting an error in data read from memory through the error interface.

In an embodiment, the error interface is configured to aggregate error information from the memory devices.

In an embodiment, for each memory device, the controller is configured to modify a data strobe signal transmitted from the memory device to the data interface in response to detecting an uncorrectable error; and the data interface is configured to transmit a data strobe signal in response to a modified data strobe signal from one or more of the memory devices.

An embodiment includes a memory device, comprising: a memory configured to store data; a controller coupled to the memory and configured to: read data stored in the memory; diagnose an error in the data read from the memory; and identify an error type of the error in response to diagnosing the error.

In an embodiment, the controller is configured to identify the error type as at least one of a soft-read error, a soft-write error, a hard error, a repairable error, and an unrepairable error.

In an embodiment, the controller is configured to diagnose the error in response to rereading the data.

In an embodiment, the controller is configured to diagnose the error in response to rewriting the data.

In an embodiment, the controller is configured to determine whether to repair the memory in response to rewriting the data.

Although the structures, methods, and systems have been described in accordance with exemplary embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the spirit and scope of the appended claims.

The invention claimed is:

1. A memory device, comprising:
   a memory;
   a data interface to communicate data to and from the memory device through a main memory path that is external to the memory device;
   an error interface to communicate error information from the memory device through a system control path that is external to the memory device, the system control path being separate from the main memory path; and a controller that is internal to the memory device, the controller being coupled to the data interface, the error interface, and the memory;

wherein the controller comprises:

an error-correcting code (ECC) engine configured to correct an error in data that is read from the memory to generate corrected data by encoding data written to the memory and decoding data read from the memory, generate error information in response to correcting the error in the data read from the memory, transmit the corrected data through the data interface, and transmit the error information through the error interface; and an ECC controller configured to record the error information in response to the ECC engine.

2. The memory device of claim 1, wherein the controller is configured to modify a data strobe signal transmitted through the data interface in response to detecting an uncorrectable error.

3. The memory device of claim 2, wherein the controller is configured to combine the data strobe signal with a signal indicating the uncorrectable error.

4. The memory device of claim 1, wherein the controller is further configured to transmit error information about an uncorrectable error through the error interface in response to detecting the uncorrectable error.

5. The memory device of claim 1, wherein the system control path comprises an out-of-band communication path with respect to the main memory path.

6. The memory device of claim 1, wherein the system control path comprises a platform management bus.

7. The memory device of claim 6, wherein the platform management bus comprises a system management bus (SMBus), an inter-integrated circuit ($I^2C$) bus, an intelligent platform management interface (IPMI) bus, or a Modbus.

8. The memory device of claim 1, wherein the system control path is substantially slower than the main memory path.

9. The memory device of claim 1, wherein the main memory path comprises a first data rate and the system control path comprises a second data rate, the second data rate being less than or equal to 1/10 of the first data rate.

10. The memory device of claim 1, wherein the error interface is capable of receiving a poll for error information.

11. The memory device of claim 1, wherein the controller is further configured to push error information through the error interface.

12. A memory module, comprising:

a data interface to communicate data to and from the memory module through a main memory path that is external to the memory module;

an error interface to communicate error information from the memory module through a system control path that is external to the memory module, the system control path being separate from the data interface and the system control path being separate from the main memory path; and a plurality of memory devices that are internal to the memory module, each memory device coupled to the data interface and the error interface and comprising:

a memory configured to store data;

a controller coupled to the data interface, the error interface, and the memory of the memory device;

wherein the controller comprises:

an error-correcting code (ECC) engine is configured to correct an error in data that is read from the memory device corresponding to the ECC engine to generate corrected data by encoding data written to the memory and decoding data read from the memory, generate error information in response to correcting the error in the data read from the memory, transmit the corrected data through the data interface, and transmit the error information through the error interface; and an ECC controller configured to record the error information in response to the ECC engine.

13. The memory module of claim 12, wherein:

for each memory device, the controller is configured to modify a data strobe signal in response to an uncorrectable error; and the data interface is configured to transmit a module data strobe signal based on the data strobe signals from the memory devices.

14. The memory module of claim 12, wherein the system control path comprises an out-of-band communication path with respect to the main memory path.

15. The memory module of claim 12, wherein the system control path comprises a platform management bus.

16. The memory module of claim 15, wherein the platform management bus comprises a system management bus (SMBus), an inter-integrated circuit ($I^2C$) bus, an intelligent platform management interface (IPMI) bus, or a Modbus.

* * * * *